United States Patent
Do et al.

(10) Patent No.: US 9,206,360 B2
(45) Date of Patent: Dec. 8, 2015

(54) PRODUCING LIQUID FUEL FROM ORGANIC MATERIAL SUCH AS BIOMASS AND WASTE RESIDUES

(71) Applicant: SOLENA FUELS CORPORATION, Washington, DC (US)

(72) Inventors: Robert T. Do, Potomac, MD (US); Sylvain A. Motycka, Washington, DC (US)

(73) Assignee: SOLENA FUELS CORPORATION, Washington, DC (US)

( * ) Notice: Subject to any disclaimer, the term of this patent is extended or adjusted under 35 U.S.C. 154(b) by 275 days.

(21) Appl. No.: 13/765,217

(22) Filed: Feb. 12, 2013

(65) Prior Publication Data

US 2014/0224706 A1     Aug. 14, 2014

(51) Int. Cl.
     *C01B 3/12*      (2006.01)
     *C01B 3/24*      (2006.01)
     (Continued)

(52) U.S. Cl.
CPC . *C10G 47/00* (2013.01); *C01B 3/48* (2013.01); *C10G 2/30* (2013.01); *C10K 1/005* (2013.01); *C10K 3/04* (2013.01); *C10K 3/06* (2013.01); *C01B 3/10* (2013.01); *C01B 2203/0233* (2013.01); *C01B 2203/0283* (2013.01); *C01B 2203/043* (2013.01); *C01B 2203/0405* (2013.01); *C01B 2203/0415* (2013.01); *C01B 2203/062* (2013.01); *C01B 2203/1241* (2013.01); *C10G 2300/1011* (2013.01); *C10G 2300/42* (2013.01); *Y02E 50/32* (2013.01)

(58) Field of Classification Search
CPC .............. C01B 2203/0233; C01B 2203/0283; C01B 2203/0405; C01B 2203/0415; C01B 2203/043; C01B 2203/062; C01B 2203/1241; C01B 3/10; C01B 3/48; C10G 2300/1011; C10G 2300/42; C10G 2/30; C10G 47/00
See application file for complete search history.

(56) References Cited

U.S. PATENT DOCUMENTS

| | | | |
|---|---|---|---|
| 5,544,597 | A | 8/1996 | Camacho |
| 5,634,414 | A | 6/1997 | Camacho |

(Continued)

FOREIGN PATENT DOCUMENTS

WO    WO-2011145917 A1    11/2011

OTHER PUBLICATIONS

US Non-Final Office Action issued Apr. 1, 2015 in related U.S. Appl. No. 13/765,192.

(Continued)

*Primary Examiner* — In Suk Bullock
*Assistant Examiner* — Derek Mueller
(74) *Attorney, Agent, or Firm* — Novak Druce Connolly Bove + Quigg LLP

(57) ABSTRACT

Liquid fuel is produced by feeding a biomass feedstock into a one stage atmospheric pressure thermo-catalytic plasma gasifier, contacting the feedstock with oxygen or steam or both to obtain a syngas stream; splitting the syngas stream into first and second streams; conveying the first stream to a water gas shift reactor for producing a modified syngas stream containing CO and hydrogen; the second stream bypassing the water gas shift reactor and being added to the modified syngas steam; optionally reforming natural gas by steam methane reforming to produce a synthetic gas and optionally adding the synthetic gas to the water gas shift reactor; thereby obtaining a syngas having a $H_2$:CO ratio of about 1:1 to about 2:1; subjecting the syngas to a Fischer Tropsch reaction thereby producing a wax product; and subjecting the product to a hydrogen cracking process to produce liquid fuel; and apparatus therefore.

19 Claims, 12 Drawing Sheets

(51) Int. Cl.

| | |
|---|---|
| *C01B 3/26* | (2006.01) |
| *C10G 47/00* | (2006.01) |
| *C10K 1/00* | (2006.01) |
| *C10K 3/04* | (2006.01) |
| *C10K 3/06* | (2006.01) |
| *C10G 2/00* | (2006.01) |
| *C01B 3/48* | (2006.01) |
| *C01B 3/10* | (2006.01) |

(56) References Cited

U.S. PATENT DOCUMENTS

| | | |
|---|---|---|
| 6,156,809 A | 12/2000 | Clark et al. |
| 6,987,792 B2 | 1/2006 | Do et al. |
| 7,622,693 B2 | 11/2009 | Foret |
| 7,632,394 B2 | 12/2009 | Dighe et al. |
| 8,052,946 B2 | 11/2011 | Dighe et al. |
| 2003/0083390 A1 | 5/2003 | Shah et al. |
| 2004/0170210 A1 | 9/2004 | Do et al. |
| 2012/0032452 A1* | 2/2012 | Kuku .......................... 290/1 R |
| 2012/0061618 A1 | 3/2012 | Santoianni et al. |
| 2012/0223274 A1 | 9/2012 | Hinton et al. |
| 2013/0005838 A1 | 1/2013 | Eilos et al. |

OTHER PUBLICATIONS

International Search Report and Written Opinion issued May 16, 2014 in PCT/US14/15792.

International Search Report and Written Opinion issued Dec. 9, 2014 in PCT/US14/15734.

* cited by examiner

| PROCESS CONNECTION LOCATION | |
|---|---|
| INSTRUMENT(S) | ANGLE ID |
| $P_{11}$ | $\phi 1°$ |
| $T_8\ T_9\ T_{10}$ | $\phi 2°$ |
| $T_8\ T_9\ T_{10}$ | $\phi 3°$ |
| $P_7$ | $\phi 4°$ |
| $T_6$ | $\phi 5°$ |
| $T_6$ | $\phi 6°$ |
| $T_2\ T_4\ T_5$ | $\phi 7°$ |
| $T_2\ T_4\ T_5$ | $\phi 8°$ |
| $T_1$ | $\phi 9°$ |
| $T_1$ | $\phi 10°$ |
| $P_3$ | $\phi 11°$ |
| $P_3$ | $\phi 12°$ |

| PROCESS CONNECTION LOCATION ||
|---|---|
| INSTRUMENT(S) | ANGLE ID |
| $P_{11}$ | $\phi 1°$ |
| $T_8 T_9 T_{10}$ | $\phi 2°$ |
| $T_8 T_9 T_{10}$ | $\phi 3°$ |
| $P_7$ | $\phi 4°$ |
| $T_6$ | $\phi 5°$ |
| $T_6$ | $\phi 6°$ |
| $T_2 T_4 T_5$ | $\phi 7°$ |
| $T_2 T_4 T_5$ | $\phi 8°$ |
| $T_1$ | $\phi 9°$ |
| $T_1$ | $\phi 10°$ |
| $P_3$ | $\phi 11°$ |
| $P_3$ | $\phi 12°$ |

PRODUCING LIQUID FUEL FROM ORGANIC MATERIAL SUCH AS BIOMASS AND WASTE RESIDUES

TECHNICAL FIELD

The present disclosure relates to a process and apparatus for producing liquid fuels from organic material, especially biomass and waste hydrocarbon feedstocks. The present disclosure relates to employing a process that comprises converting organic material, especially solid biomass and waste products, to a bio-synthetic gas (bio-syngas) product, converting a large portion of the bio-syngas into a mixture of synthetic gas (balanced into a correct composition) derived from natural gas, prior to its conversion into synthetic liquid fuels via a Fischer-Tropsch reaction (FT) and fuel upgrade system into the production of kerosene, diesel and naphtha. The excess steam and unconverted tail gas from the Fischer-Tropsch reaction and upgrading system can be used to generate electricity for auto consumption (cover parasitic load) and exported to the grid.

BACKGROUND ART

The transport industry, in particular the aviation and marine sectors, are facing enormous challenges in the upcoming future. Apart from the recent economic and financial crisis, there are challenges such as security of fuel supply, meeting emission requirements and environmental restrictions. From the aviation industry's perspective, the biggest challenge of all is how the industry can continue at its current growth rate of over 5% per year while reducing their share of the carbon dioxide ($CO_2$) emissions.

Globally, the aviation sector produces about 2% of man-made carbon dioxide, according to the IPCC. But with the forecast growth in demand for air services from commercial passengers, air cargo to military, their emissions will grow if cleaner actions are not taking place. As a consequence, the aviation industry has developed a set of ambitions targets aimed at limiting its climate impact while enabling it to continue to provide a key vehicle for economic growth. The targets include (1) the improvement of fleet fuel efficiency by 1.5% per year until 2020; (2) capping net aviation $CO_2$ emissions from 2020; (3) and to halve all aviation $CO_2$ emissions by 2050, compared to 2005.

It is clear that their targets will not be met by technical or operational improvements within the aviation industry alone, nor with just improvements to air traffic control infrastructure and management. These effects can, however, help meet the industry target only with the use of low-carbon, sustainable aviation fuels, such as bio-fuels or biosynthetic fuels.

Aviation has no alternative to liquid fuels for the foreseeable future, unlike ground transportation or power generation, which have had a choice of energy success (such as hybrid technology, batteries, wind or solar). Aviation must, therefore, aim to replace fossil-based petroleum fuels with lower carbon alternatives such as second generation advanced bio synthetic fuels.

The first generation of biofuels has been highly criticized for its negative impact on both people and the environment. Food price issues, land and water use and pollution have all been of great concern. Furthermore, the aviation industry is technically unable to use many of these first generation fuels. Ethanol freezes at the high altitudes at which jet turbines operate (−50° C.) and biodiesel does not carry the required energy density.

Safety is the most important aspect of aircraft systems, closely followed by its economic performance. Since commercial aviation started, the reliability of engines and jet propulsion systems have continuously improved, and today a modern jet aircraft has an engine failure rate less than 0.002/1000 hrs. This is dependent on an extremely reliable propulsion system with every component, including the fuel, to meet very specific requirements. The safety issues and cost aspects impose very strict regulations and requirements on the fuel that is used for aircraft engines.

Jet engine fuel is kerosene, lighter than diesel and heavier than gasoline. Jet fuel comes in different versions or according to different standards. For commercial aviation, the fuel is named Jet A-1, Jet-A or sometimes AVTUR (Aviation Turbine Fuel). The standards ASTM D1655 (US) and Defense Standard 91-91 (UK) prescribes properties of the fuel, such as freezing point, ignition point, boiling point and several (features) specifications of the fuel must be observed. Altogether, the strict specifications for aviation fuel substantially raises the bar for what can be used in real flights compared to land transport systems.

The aviation biofuels will have to, therefore, be "drop-in", i.e., virtually identical to the Jet A-1 fuel. This means that it can be "dropped" into the current fuel supply. The only synthetic paraffinic kerosene (SPK) produced by a Fischer Tropsch process meets and exceeds all the required specifications of Jet A1 and can therefore be blended on a 50/50 mix to meet ASTM and Defense Standard specifications. Furthermore, airlines have been using blends of FT fuels for many years with no engine or safety issues particularly in South Africa.

SUMMARY OF DISCLOSURE

The present disclosure relates to the production of liquid fuels such as "drop in" synthetic paraffinic kerosene from renewable hydrocarbon sources such as biomass, waste residues from agriculture, forestry or urban household waste in an Integrated Plasma Gasification of Biomass—Gas to Liquid facility (IPBGTL).

The process of the present disclosure is concerned with producing a stable and drop-in liquid fuel from biomass feed stock which comprises:

a) feeding a biomass feedstock into a plasma gasifier operating at about atmospheric pressure or slightly below, contacting the feedstock with oxygen or oxygen enriched air or steam or mixtures thereof to convert organic components of the biomass into a syngas stream;

b) cooling the syngas through a heat exchanger, cleaning it to remove its particulate matter and chemical impurities and compress it from or about atmospheric pressure to a suitable pressure to meet downstream systems' requirements;

c) splitting the syngas stream into a first stream and a second stream; conveying the first stream to a water gas shift reactor for producing a modified syngas stream containing carbon monoxide and hydrogen;

d) the second stream bypassing the water gas shift reactor and being added to the modified syngas steam from the water gas shift reactor;

e) optionally reforming natural gas by steam methane reforming to produce a synthetic gas and optionally adding the synthetic gas to the water gas shift reactor;

f) obtaining syngas having a $H_2:CO$ ratio of about 1:1 to about 2:1 from b), c) and optionally d);

g) subjecting the syngas having a $H_2:CO$ ratio of about 1:1 to about 2:1 to a Fischer Tropsch reaction thereby producing a wax product; and h) subjecting the wax product to a hydrogen cracking process to produce a stable and drop-in liquid fuel.

Another aspect of the present disclosure relates to apparatus for converting biomass feedstock into liquid fuel which comprises:
  a) a gasifier comprising an inlet for introducing a biomass feedstock and outlet conduit for removing a syngas;
  b) the outlet conduit from the gasifier leads to an inlet of a syngas cooling system also known as heat exchanger to raise steam that can either be exported or used by the facility as a utility;
  c) the outlet of the cooling system leads to a cleaning system that comprises a quenching system to remove particulate matter contained in the syngas and subsequent scrubbers to remove its chemical impurities;
  d) the outlet of the cleaning system leads to a compressor to raise the syngas pressure to such a level that it meets downstream equipment's requirements;
  e) the outlet of the compressor leads to a splitting system, wherein the syngas splitting system has two outlets and wherein one of the outlets of the syngas splitting system leads to an inlet of a water gas shift reactor and the other outlet bypasses the water gas shift reactor and leads to an outlet from the water gas shift reactor to combine with product from the water gas shift reactor;
  f) an inlet for natural gas into a steam methane reformer and outlet from the steam methane reformer for exiting a synthetic gas from the steam methane reformer and for leading the synthetic gas to an inlet of the water gas shift reactor;
  g) the outlet from the water gas shift reactor leading to an inlet to a Fischer Tropsch reactor;
  h) an outlet from the Fischer Tropsch reactor for exiting a wax product;
  i) the outlet from the Fischer Tropsch reactor leading to an inlet to a hydrogen cracking reactor; and
  j) an outlet from the hydrogen cracking reactor for removing liquid fuel from the hydrogen cracking reactor.

Still other objects and advantages of the present disclosure will become readily apparent by those skilled in the art from the following detailed description, wherein it is shown and described preferred embodiments, simply by way of illustration of the best mode contemplated. As will be realized the disclosure is capable of other and different embodiments, and its several details are capable of modifications in various obvious respects, without departing from the disclosure. Accordingly, the description is to be regarded as illustrative in nature and not as restrictive.

BRIEFS DESCRIPTION OF DRAWINGS

DESCRIPTION OF BEST AND VARIOUS MODES FOR CARRYING OUT DISCLOSURE

In order to facilitate an understanding of the present disclosure, reference will be made to the FIGS.; wherein like numbers in different FIGS. have the same meaning. It is understood that the FIGS. are not drawn to scale unless otherwise stated.

Figure 1:
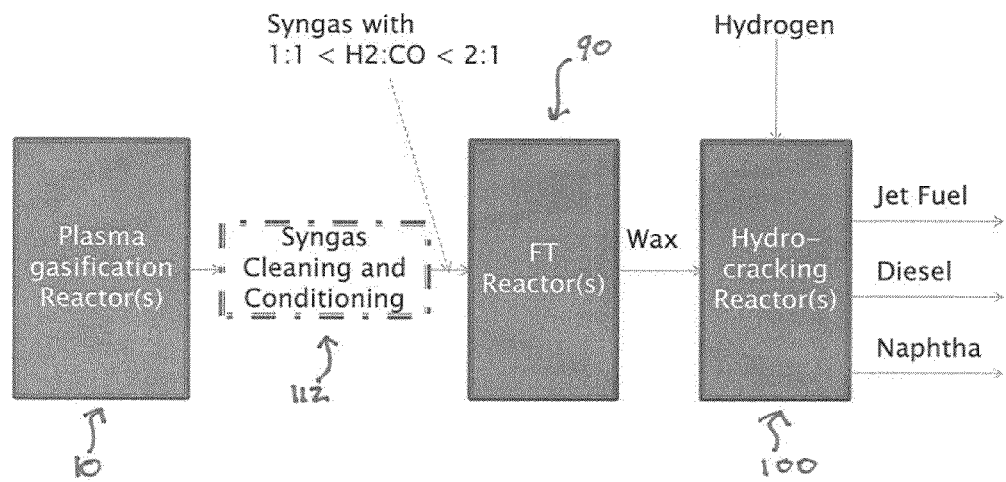
FIG. 1 is a schematic diagram of partial apparatus illustrating some of the basic steps employed according to this disclosure.
Figure 11:
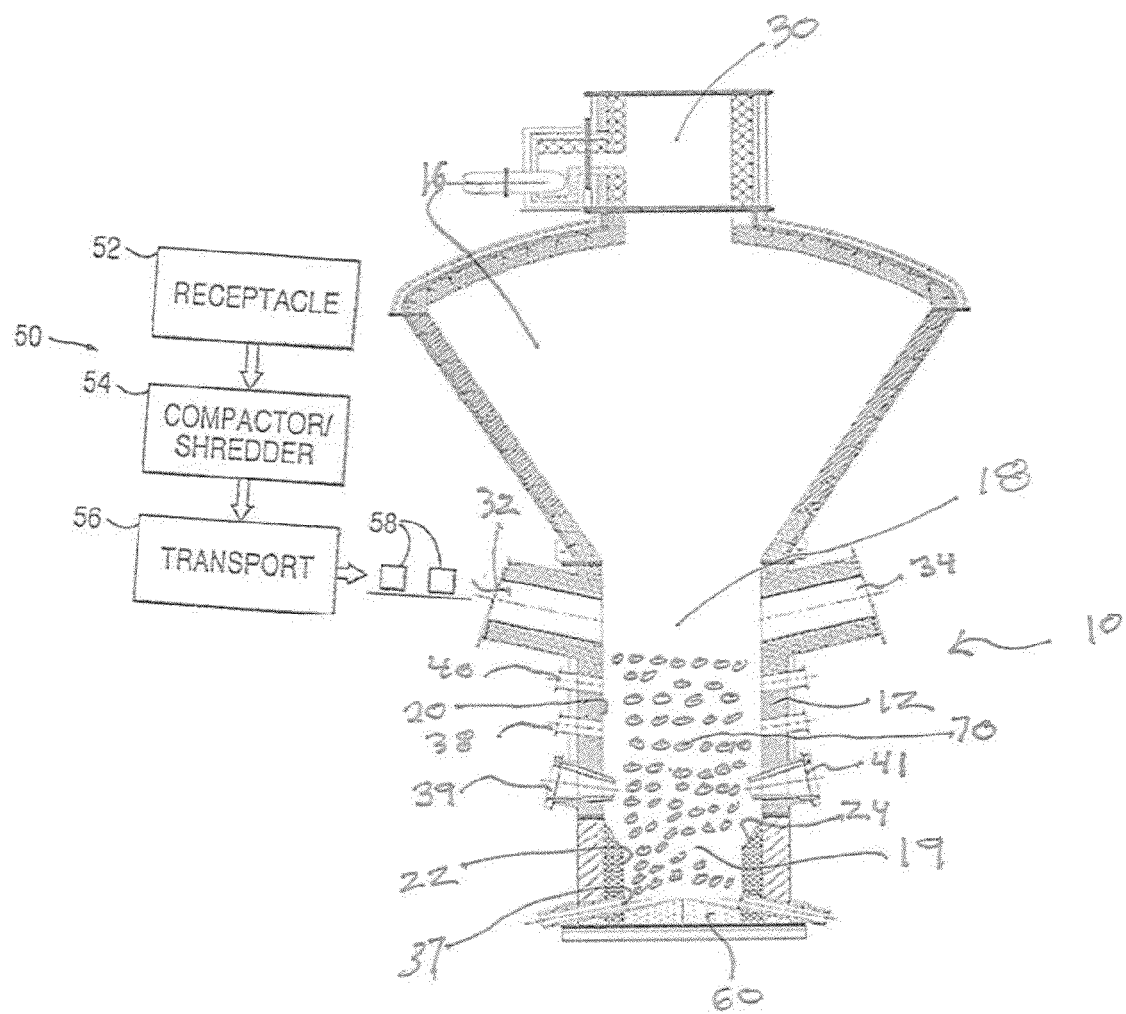
FIG. 11 is an elevation view of a gasifier that can be used with an embodiment of the present disclosure.

FIG. 1 is a schematic diagram illustrating a portion of one embodiment of this disclosure wherein 10 represents a gasifier. The preferred gasifiers employed according to the present disclosure are those disclosed in U.S. Pat. Nos. 5,544,597; 5,634,414 and 6,987,792 and U.S. patent application Ser. No. 13/765,192, filed concurrently herein and entitled Plasma Gasification and Vitrification of Organic Material for the Production of Renewable Energy all of which are assigned to Solena Fuels Corporation, the assignee of the present application, disclosures of which are incorporated herein by reference. The most preferred gasifiers employed according to the present disclosure are those disclosed in U.S. Pat. No. 6,987,792 and the above referenced concurrently filed U.S. patent application Ser. No. 13/765,192. The gasifier 10 is preferably operated at about atmospheric pressure (about 101325 Pa) or slightly below atmospheric pressure, which is typically up to about 500 Pa below atmospheric pressure and more typically about 200 Pa to about 500 Pa below atmospheric pressure. FIG. 11 is a perspective view of a gasifier in accordance with the invention of the above referenced U.S. patent application. By way of example, a typical gasifier used in this apparatus and method may be sized to process from 5 to 24 metric tonnes per hour of mixed sources of organic material and/or biomass, although gasifiers sized larger or smaller may be used; the exact throughput will depend on the composition of the feed material and the desired overall throughput of the generating plant.

As shown in FIG. 11, a one stage atmospheric pressure thermo-catalytic plasma gasifier 10 is constructed preferably of high-grade steel. This gasifier illustrated in FIG. 11 can be distinguished from other biomass plasma gasification reactor by the fact that it operates at about atmospheric pressure or slightly below atmospheric pressure and high temperature (greater than 1,200° C.) to ensure that there are no unconverted hydrocarbon molecules in the syngas product. In particular, as mentioned above, the gasifier 10 is preferably operated at about atmospheric pressure (about 101325 Pa) or slightly below atmospheric pressure, which is typically up to about 500 Pa below atmospheric pressure and more typically about 200 Pa to about 500 Pa below atmospheric pressure. This one stage gasification process is unique since, as opposed to every other biomass gasification systems, it produces a syngas product free of tar that does not need to be processed in a secondary syngas cracking chamber.

In addition, the thermo-catalytic plasma gasification process is also unique in the sense that it makes it possible to continuously control and monitor the catalytic bed composition and height whose purpose is multifold. First, its constituents are typically mainly carbon, silica and calcium oxide to address specific gasification/vitrification process operating conditions.

Carbon is used, such as by means of coke, to ensure that the plasma heat distribution across the cross-section of the reactor due to its high fixed-carbon content in contrast of the high volatile matter content of biomass. Silica and calcium oxide are used to maintain the proper and adequate lava pool chemistry prior to being tapped out of the reactor. These catalysts are continuously mixed together prior to being injected into the gasification reactor through a specific feeding system in such a way that the carbon to silica to calcium oxide ratio ($C:SiO_2:CaO$) optimizes the gasification operating conditions.

The gasifier 10 has a refractory lining 12 throughout its inner shell. Typically, the upper two-thirds of the gasifier is lined with up to four layers of refractory material and preferably three, with each layer about 4 to 6 inches thick or about 10 to 14 inches thick. Typically, the lower third of the gasifier is lined with up to four layers of refractory brick, and preferably three, for a total thickness of about 20 to 30 inches. Depending upon the application other refractory configurations may be used. Both sections utilize typical commercial refractory products, which are known to those in the reactor industry.

The gasifier 10 is shaped like a funnel and is divided into three sections. The top third of the gasifier is referred to as thermal cracking zone 16. Typically, gas exits the gasifier through a single outlet 30 in the center of the top of zone 16. Alternatively, a plurality of exit gas outlets may be provided around the top of zone 16.

The middle section 18 of the gasifier, also called the bed zone, is defined by a side wall 20 having a circumference smaller than that of zone 16. In the upper part of the section 18 and above the catalyst bed are two opposing feed biomass inputs 32 and 34, although a larger number may be provided. Typically the inputs 32 and 34 are located in the upper 50% and more typically in the upper 20% of section 18. Also the inputs 32 and 34 are typically at an angle of about 45 to about 90 degrees and more typically at an angle of about 60 to about 85 degrees relative to the vertical axis of the gasifier 10.

Section 18 is also encircled by two or more gaseous oxidant rings such as oxygen-enriched air or oxygen rings or steam. Each ring injects, for example, oxygen-enriched air and/or oxygen and/or steam in the bed zone (as pre-determined according to the biomass composition), through equally spaced inlets, called secondary tuyeres, 38 and 40. However, the most important fraction of enriched air or oxygen and/or steam is injected under the bed zone through primary tuyeres, referenced as 39 and 41, which are typically made of water cooled copper. The number of primary tuyeres, which house non transferred plasma arc torches, typically ranges from two to six. The number of gas tuyeres may typically range from six to ten depending on the size of the gasifier and the throughput of the system, although a larger or smaller number may be used.

The number of rings may typically range from two to three depending on the catalyst and biomass bed height; although a larger or smaller number may be used.

Concerning the oxidant, nitrogen is considered an inert molecule in the syngas and therefore does not contribute to any process located downstream of the gasification reactor, including chemical synthesis or electricity production. Furthermore, the more nitrogen there is in the syngas—or inert to a further extent—the larger is the volume of syngas to process in subsequent systems.

As a consequence, since there is no commercially available system to remove nitrogen from syngas, large systems located downstream of the one stage thermo-catalytic gasification reactor would be needed to handle the syngas which therefore would raise the facility's capital expenditure. Accordingly, the typical oxidant is oxygen or oxygen enriched-air. The oxygen enriched-air shall have sufficiently high oxygen content typically at least about 80% and more typically at least about 95% to be qualified as a viable oxidant agent.

The bottom third of the gasifier is vitrification zone 19, which is defined by a side wall 22 having a circumference smaller than that of zone 18. Side walls 20 and 22 are connected by a frustoconical portion 24. Vitrification zone 19 houses one or more tap holes where molten slag liquid is tapped continuously typically into a refractory lined sand bin (not shown), where it is cooled into an inert slag material suitable for re-use as construction material. (Construction materials with which this slag may be used include tile, roofing granules, and brick.) This bottom section of the gasifier, which contains the molten slag, may, in certain configurations, be attached to the gasifier via a flanged fitting to enable rapid replacement of this section in the event of refractory replacement or repairs.

Each non transferred plasma arc torch plugged in primary tuyeres 39 and 41 is generally supplied with electric power, cooled deionized water and plasma gas through supply conduits from appropriate sources (not shown). The number of torches and primary tuyeres, the power rating of each torch, the capacity of the biomass feeding system, the amount of catalyst, the amount of flux, the size of the gasifier, the size and capacity of the syngas cleaning system and the size of the combined cycle gas turbine system are all variable to be determined according to the type and volume of biomass to be processed by the system. There are typically at least 3 and more typically at least 4 plasma torches around the circumference of the reactor 10.

Figure 13:
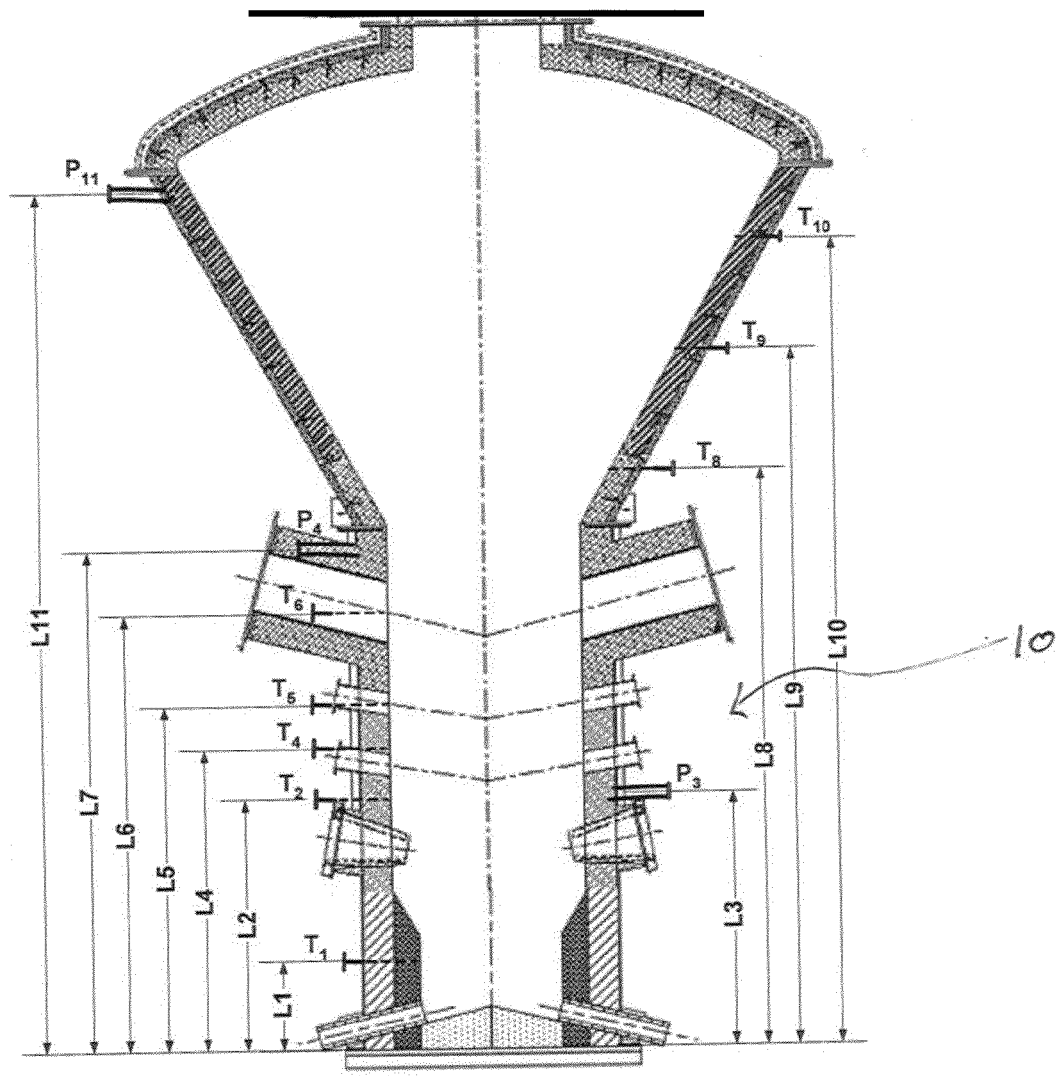
FIG. 13 is an elevation partial view of a gasifier used with an embodiment of the present disclosure illustrating representative pressure and temperature sensors.
Figure 14A:
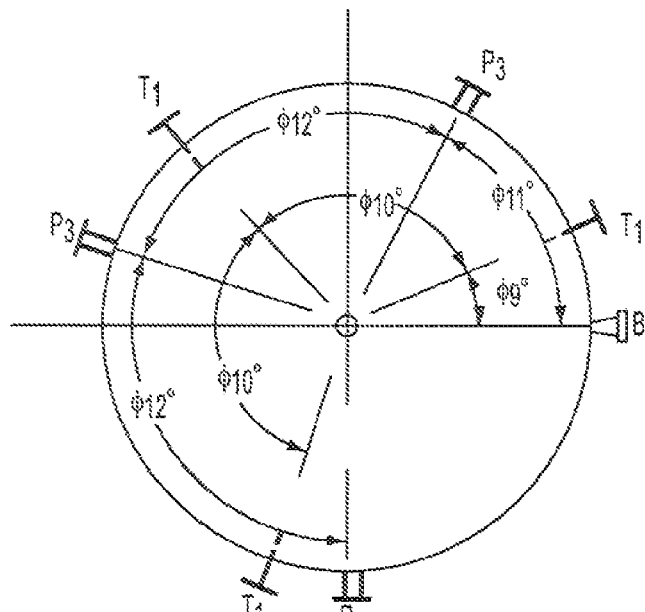
FIGS. 14A-14C are cross-sectional views of FIG. 13 illustrating location of representative pressure and temperature sensors.
Figure 14B:
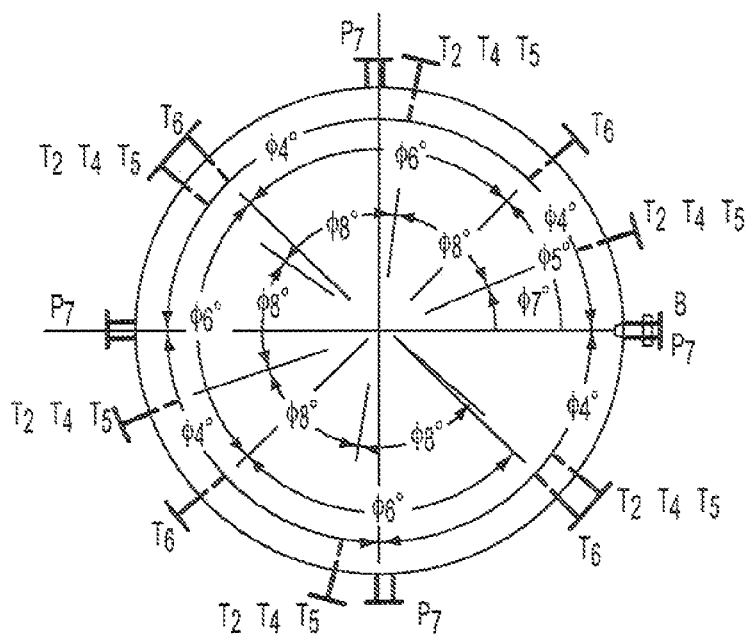
Figure 14C:
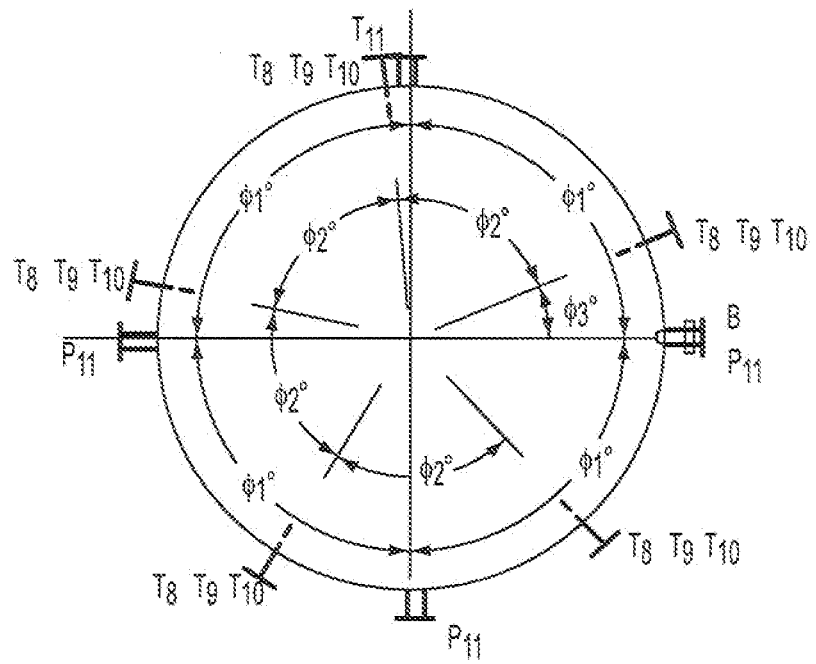

The gasifier will typically contain throughout its shaft at intervals of about three feet or less, sensors to detect the pressure and temperature inside the gasifier, as well as gas sampling ports and appropriate gas analysis equipment at strategic positions in the gasifier to monitor the gasification process. The use of such sensors and gas analysis equipment is well understood in the art. See FIG. 13, which is an elevation partial view of gasifier 10 illustrating representative pressure sensors P3, P4 and P11 and temperature sensors T1, T2, TT4, T5, T6, T8, T9 and T10. Also, see FIGS. 14A-14C which are cross-sectional views of FIG. 13 illustrating location of representative pressure sensors P3, P7 and P11 and temperature sensors T1, T2, TT4, T5, T6, T8, T9 and T10. The nozzles of the sensors are spaced equidistantly around the circumference of the gasifier. The number of the nozzles of the sensors and types of sensors shown is for illustration purposes only.

Biomass and Biomass Feeding System

A compacting biomass delivery system operating through hydraulic cylinders to reduce the biomass volume and to remove air and water in the biomass prior to feeding into the top of the bed zone as previously described and disclosed in the above identified Solena Fuels Corporation patents can be employed.

In order to accommodate biomass and biomass-residues, as per its definition by the UNFCC[1], organic renewable feed stocks biomass from multiple and mixed sources such as RDF (refuse-derived fuel), loose municipal solid waste (MSW), industrial biomass, and biomass stored in containers such as steel or plastic drums, bags and cans, a very robust feeding system can be used. Biomass may be taken in its original form and fed directly into the feeding system without sorting and without removing its containers. Biomass shredders and compactors capable of such operation are known to those of ordinary skill in the field of materials handling. Biomass feed may be sampled intermittently to determine composition prior to treatment.

[1] http://cdm.unfccc.int/Reference/guidclarif/mclbiocarbon.pdf (a) Biomass means non-fossilized and biodegradable organic material originating from plants, animals and micro-organisms. This shall also include products, by-products, residues and waste from agriculture, forestry and related industries as well as the non-fossilized and biodegradable organic fractions of industrial and municipal wastes. Biomass also includes gases and liquids recovered from the decomposition of non-fossilized and biodegradable organic material. (b) Biomass residues means biomass by-products, residues and waste streams from agriculture, forestry and related industries.

It is important that the system be purged with an inert gas. Accordingly either carbon dioxide or nitrogen could be used. In U.S. Pat. No. 6,987,792, it is mentioned that the compacting system shall be nitrogen purged. One of the reasons for having a nitrogen purged system, instead of air, is to avoid that the screw gets back-fired as it conveys feedstock towards the reactor. It is crucial that the system be purged with an inert gas, although not necessarily with nitrogen. The advantage of using nitrogen is that it is not expensive to produce. On the other hand, the main downside is that it increases the amount of nitrogen in the gas of synthesis (other sources of nitrogen are the air going through the plasma torch system and the nitrogen contained in the feedstock).

According to preferred aspects of the present disclosure, an alternative to nitrogen as a purging agent is carbon dioxide. Although it will inevitably increase the amount of $CO_2$ in the syngas, off-the-shelf systems are commercially available to extract carbon dioxide from a syngas—unlike nitrogen—such as a Rectisol, Selexol or an amine unit. This alternative is particularly interesting in a scenario where a $CO_2$ removal unit would have to be used in any case, as it now provides a cheap alternative to decrease inert content in syngas.

The biomass can be comminuted to a preset size to insure optimal performance of the gasifier. The feeding rate can also be preset to ensure optimum performance of the gasifier. Typically the organic material injected into the reactor has a physical size not less than about 2 cm in diameter to avoid pressure drop effect. Similarly, its size typically does not exceed 5 cm in diameter to ensure that the bed height does not exceed a specified maximum, thus limiting the reactor shaft's height.

For example, the pressure drop across the bed would be about 900 Pa/m if the particle size were 1 cm in diameter; whereas, it is only 10 Pa/m with a particle size of 5 cm in diameter. However, bed heights vary as a function of particle size and the bed height would be about 0.5 m if the particle size were 1 cm in diameter whereas it is 2.5 m with a particle size of 5 cm in diameter. Therefore, the overall pressure drop would be respectively 400 Pa and 25 Pa.

Therefore particle size and to a further extent pressure drop have significant impact on the design, and thus cost, of the induced draft located downstream of the reactor to extract the syngas. Consequently, the bigger the particle size is, the less pressure drop occurs, but the higher is the bed height. The optimum particle size is about 3 to about 5 cm in diameter.

The blocks of biomass are delivered into the gasifier continuously from multiple locations in zone 18 of the gasifier, ensuring even distribution in the gasifier until a specific biomass bed height is achieved above the consumable catalyst bed. Two blocks of biomass may be fed simultaneously into input chutes provided at diametrically opposite sides of gasifier 10. More than two chutes may be provided to accept additional blocks. Any arrangement is suitable, so long as it avoids an uneven build-up of biomass in any one location in zone 18 of the gasifier.

The lifetime of the refractory materials and thus the reactor operating conditions as well are enhanced by injecting the biomass feedstock into the upper part of the bed zone 18 instead of the upper section 16 of the gasifier.

In addition, for reliability purposes, a reactor should typically house at least two (2) feeding systems for the organic feedstock and at least one (1) feeding system for the catalyst material. This is due to the fact that catalyst material cannot be compacted with organic material due to their different densities. Catalyst material is composed of coke, silica and fluxing agent in a respective mixing ratio and which depends on (i) the gasification reactor dimensions and (ii) feedstock properties especially ultimate and proximate compositions.

Pressure sensors and temperature sensors along the gasifier, as well as microwave sensors on top of the gasifier, can be used to measure bed height and control the feeding rate of the biomass and catalyst. As a back-up, sight ports may be provided at certain locations to verify activities inside the gasifier. All information from the sensors will be fed into a digital control system (DCS) that coordinates the operation of the whole plant performance. The coordination and monitoring of the feeding system through the use of sensors and a DCS as part of the process control of the gasifier are normal protocol and readily apparent to those skilled in the art.

Alternate configurations of the feeding system may be used for different materials. For instance, fine powders or liquid biomass may be injected directly into the gasifier. Gas transport may be used for fine solids, such as coal fines. Standard pumps may be used for liquids. Such systems are well known to practitioners of material handling.

Operation of the SPGV Reactor

The shredded and compacted biomass material 58 is fed by the feeding system continuously into gasifier 10. For the sake of simplicity, the continuous feeding from opposite sides of the gasifier ensures uniform distribution of the biomass feed across the cross section of the gasifier. The uniformity of the biomass feed distribution as it forms a biomass bed ensures the uniform, upward flow of hot gas from the plasma torches heated catalyst bed. The catalyst bed toward the bottom of the gasification reactor is constantly heated by the plurality of plasma torch plumes uniformly distributing the heated gas and feedstock particles upward across the cross section of the gasifier. The heat and hot gas when distributed uniformly upward heat and dry the down-flowing biomass feed and enables the gasification processes to occur efficiently. The uniform heat distribution upward and the presence of the catalyst bed also avoids channeling of the heat, which in turn prevents the bridging of the biomass feed, which is a typical problem encountered in other thermal biomass treatment processes and potentially leads to tar formation and presence in the syngas, thus altering the overall plant efficiency.

The gasifier's funnel shape and the rising gas feed rate (from the torches and other gas inlets) are designed to ensure minimum superficial velocity of the rising hot gases. This low superficial velocity allows the entering biomass feed to descend into the biomass bed completely and not be forced upward into the exiting gas as unprocessed biomass or particulate carryover. Additionally, the cracking zone 16 of the gasifier serves to ensure that all hydrocarbon materials are exposed to the high temperature with residence time in excess of 2-3 seconds prior to exiting the gasifier. This zone completes the thermal cracking process and assures complete gasification and conversion of higher hydrocarbons into carbon and hydrogen.

As the cold waste feeds are continuously fed into the plasma gasifier and form a bed of biomass on top of a previously heated bed of consumable catalyst in the bottom of the gasifier, the descending cold waste and the rising heated gas from the consumable carbon catalyst bed create a counter-current flow that allows the complete pyrolysis/gasification of the hydrocarbon material uniformly across the gasifier.

The primary material that constitutes the consumable catalyst bed applied and used in this process is not unlike that used in typical metallurgical blast furnaces, and its inclusion into the gasification process serves at least the following several functions: (1) it allows for the distribution of the plasma-generated heat uniformly across the cross section of the plasma gasifier and thus prevents the excessive wear and tear in the refractory that is normally encountered when intense focal heat sources such as plasma torches are utilized; (2) it initiates the gasification reaction by providing the key component of the exit gas, i.e., the carbon monoxide contributing to the heating value of the exit top gas; (3) it provides a porous but solid support framework at the bottom of the gasifier upon which the biomass bed can be deposited; (4) it allows the hot gases along with hot carbon particles to move upward into and through the biomass bed uniformly, while allowing the inorganic material in the biomass such as metal and ash to be melted and to flow downward into the molten pool at the bottom of the gasifier; and (5) it provides a layer of protection inside the innermost refractory layer and thus decreases heat loss in the gasifier while extending the refractory life.

In addition, the catalytic bed composition and height, whose purpose is multifold, are continuously controlled and monitored. First, its constituents are typically mainly carbon, silica and calcium oxide to address specific gasification/vitrification process operating conditions. Carbon is used, by means of coke, to ensure the plasma heat distribution across the cross-section of the reactor due to its high fixed-carbon content in contrast of the high volatile matter content of biomass. Silica and calcium oxide are used to maintain the proper and adequate lava pool chemistry prior to being tapped out of the reactor. These catalysts are continuously mixed together prior to being injected into the gasification reactor through a specific feeding system in such a way that the carbon to silica to calcium oxide ratio ($C:SiO_2:CaO$) optimizes the gasification operating conditions The bed of catalyst is maintained by injecting catalyst at a rate of about 2% to about 10%, and preferably about 3% to about 5% of the biomass weight rate. It is constantly consumed at a slower rate than is the biomass bed due to its higher density of fixed carbon atoms, higher melting temperature, and hard physical properties. The height of the consumable catalyst bed, like the biomass bed, is monitored constantly via sensors located circumferentially around the gasifier and at various elevations along the shaft. This is how the feed rate and biomass feed rate can be independently triggered. As biomass bed and catalyst bed 70 are consumed during the process, the sensors will detect a temperature and pressure gradient across the gasifier and automatically trigger the feeding system to increase or decrease the bed height in a steady-state operation in order to maintain the optimum syngas power.

The interaction of a catalysis bed and molten material is a well-understood phenomenon. In the case of molten metal flowing over hot coke, as in the case of foundry cupola melters, the molten iron does not stick to the hot bed but flows over it. The same phenomenon is observed during the melting of non-metallic material, i.e., vitrification of slag. Unlike metal melting, slag vitrification does not involve dissolution of carbon since the solubility of carbon from the coke into the molten slag is negligible.

The hydrocarbon portion of the biomass will be gasified under the partially reducing atmosphere of the gasifier in an oxygen-deprived (with respect to complete oxidation of carbon to carbon dioxide) environment. Therefore, there is no combustion process occurring in the gasifier to produce the pollutants normally expected from incinerators, such as semi-volatile organic compounds SVOCs, dioxins, and furans, which are carcinogenic compounds.

The controlled introduction of oxygen and/or oxygen-enriched air and/or steam into the plasma gasifier to generate a controlled partial oxidation reaction of gasification will generate an exit top syngas with higher calorific content while reducing the specific energy requirement, that is, the energy consumed by the plasma torches to gasify the biomass. This in turn results in a higher net energy production from the gasification of organic biomass.

The biomass bed is continuously reduced by the rising hot gases from the consumable catalyst bed and continuously replenished by the feeding system in order to maintain the bed height. This sequence results in a temperature gradient from at least about 3000° C. at the bottom of the gasifier to at least about 1200° C. in the exit syngas outlet. The rising counter-current system thus established serves to dry the incoming biomass and thus allow the system to handle a biomass stream with moisture content of up to 90% in the case that high moisture biomass is used without causing shutdown as in other thermal combustion system. Naturally, the high moisture content of the biomass feed would result in a syngas with lower heating value due to the lower hydrocarbon content of the biomass feed.

The gasifier typically operates at about atmospheric pressure or more typically slightly below atmospheric pressure due to the exit gases being constantly extracted out of the gasifier, for instance, by an induction fan (ID fan) or blower (not shown). As mentioned previously, the gasifier conditions are reducing to partial oxidation in nature, with mostly limited oxygen conditions suitable for the gasification process. The independent control variables of the process are (1) the biomass feed rate, (2) the consumable catalyst bed height, (3) the torch power, (4) the oxidant gas flow, and (5) the $C/SiO_2/CaO$ mixing ratio of the flux catalyst material considered in the process.

The molten pool at the bottom of inorganic at the bottom of the gasifier 10 is tapped continuously out of the gasifier via slag tap 37 into refractory-lined sand boxes and cast into large blocks to maximize volume reduction.

To ensure that the slag flow is uniformly constant and to prevent plugging of the slag tap hole 37, the temperature of the slag as reflected in the temperature of the gasifier bottom thermocouple system as well as the slag viscosity may be independently controlled by the plasma torch power and the amount of C/SiO$_2$/CaO mixing ratio of the catalyst, through known relations. Lava pool height is also measured by the use of thermal sensors.

All these monitored parameters regarding the temperature, pressure, gas composition, and flow rates of gas and molten material are fed as inputs into a computerized DCS system, which in turn is matched to process controls of the independent variables such as torch power, air/gas flow, biomass and catalyst feed rates, etc.

Depending on the previously analyzed waste feed, specific gasification and vitrification conditions are predetermined and parameters pre-set by the DCS control system. Additional and optimizing conditions will be generated and adjusted during start-up of operation when actual biomass materials are fed into the system.

Start-Up

The goal of a defined start-up procedure is to create a gradual heat up of the plasma gasifier to protect and extend the life of the refractory and the equipment of the gasifier, as well as to prepare the gasifier to receive the biomass feed material. Start-up of the gasifier is similar to that of any complex high-temperature processing system and would be evident to skilled artisans in the thermal processing industry once aware of the present disclosure. The main steps are: (1) start the gas turbine on natural gas to generate electricity; (2) gradually heat up the gasifier by using a natural gas burner (this is done primarily to maximize the lifetime of the refractory material by minimizing thermal shock) and switch to plasma torches once suitable inner temperatures are reached; and (3) start the gas clean-up system with the induced draft fan started first. The consumable catalyst bed 70 is then created by adding the material such that a bed is formed. The bed will initially start to form at the bottom of the gasifier, but as that initial catalyst, which is closest to the torches, is consumed, the bed will eventually be formed as a layer above the plasma torches at or near the frustoconical portion 24 of the gasifier.

Biomass or other feed materials can then be added. For safety reasons, the preferred mode of operation is to limit the water content of the biomass to less than 5% until a suitable biomass bed is formed. The height of both the consumable catalyst bed and the operating biomass bed depends upon the size of the gasifier, the physico-chemical properties of the feed material, operating set points, and the desired processing rate. However, as noted, the preferred embodiment maintains the consumable catalyst bed above the level of the plasma torch inlets.

Steady-State Operation

When both the biomass bed and the catalyst bed reach the desired height, the system is deemed ready for steady operation. At this time, the operator can begin loading the mixed waste feed from the plant into the feeding system, which is set at a pre-determined throughput rate. The independent variables are also set at levels based on the composition of the biomass feed as pre-determined. The independent variables in the operation of the SPGV gasifier are typically:

A. Plasma Torch Power
B. Gas Flow Rate
C. Gas Flow Distribution
D. Bed Height of the Biomass and Catalyst
E. Feed Rate of the Biomass
F. Feed Rate of the Catalyst During the steady state, the operator typically monitors the dependent parameters of the system, which include:

A. Exit Top Gas Temperature (measured at exit gas outlet)
B. Exit Top Gas Composition and Flow Rate (measured by gas sampling and flow meter at outlet described above)
C. Slag Melt Temperature and Flow Rate
D. Slag Leachability
E. Slag Viscosity During operation and based on the above described principles, the operator may adjust the independent variables based upon fluctuations of the dependent variables. This process can be completely automated with pre-set adjustments based on inputs and outputs of the control monitors of the gasifier programmed into the DCS system of the plasma gasifier and the whole plant. The pre-set levels are normally optimized during the plant commissioning period when the actual biomass feed is loaded into the systems and the resultant exit top gas and slag behavior are measured and recorded. The DCS will be set to operate under steady state to produce the specific exit gas conditions and slag conditions at specified biomass feed rates. Variations in feed biomass composition will result in variations of the monitored dependent parameters, and the DCS and/or operator will make the corresponding adjustments in the independent variables to maintain steady state.

Figure 2:
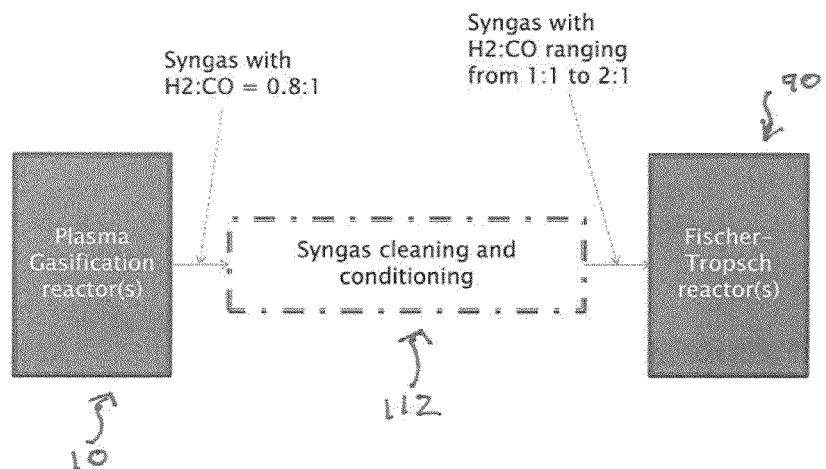
FIG. 2 is a schematic diagram of partial apparatus illustrating some of the basic steps employed according to another embodiment of this disclosure.

The exit gas can be introduced into syngas cleaning and conditioning apparatus 80 (see FIG. 1). Procedures to clean the exit gas are described in the above mentioned Solena Patents. As illustrated in FIGS. 1 and 2, the syngas exiting the gasifier 10 is processed in a Fischer-Tropsch system 90 where it is synthesized into a paraffinic wax. Prior to the Fischer-Tropsch reaction, the syngas can be sent to cleaning and conditioning 112. Fischer-Tropsch chemistry is driven by the following main reaction:

$(2n+1)H_2 + nCO \rightarrow C_nH_{(2n+1)} + nH_2O (n>1)$

The heavy wax is subsequently upgraded into lighter and more valuable products such as synthetic paraffinic kerosene (SPK a.k.a as jet fuel), diesel and naphtha. This is commonly known as wax hydrocracking, where hydrogen in injected into a hydrocracking reactor 100 and reacts with the heavy wax.

Most of the Fischer-Tropsch technologies use a cobalt-based catalyst or an iron-based catalyst. In the former case, a standard syngas composition at the Fischer-Tropsch inlet requires a H$_2$:CO molecular ratio of about 2:1, whereas the latter case requires a syngas with a H$_2$:CO molecular ratio of about 1:1. Fischer Tropsch reactions are known and need not be described herein in any detail. Examples of Fischer Tropsch reactions can be found in U.S. Pat. Nos. 6,534,552; 6,976,362; 7,300,642, 7,208,530 and 7,303,731, disclosures of which are incorporated herein by reference.

However, a typical syngas composition at the outlet of a plasma reactor of the type employed in the present disclosure is shown in the table below.

| Temperature (° C.) | 1220-1250 |
|---|---|
| Composition (vol. %) | |
| CO | 35-45 |
| CO$_2$ | 5-9 |
| H$_2$ | 30-35 |
| N$_2$ | 2-5 |
| H$_2$O | 13-18 |
| H$_2$S/COS/HCl/HCN/NH$_3$ | traces |
| Typical mol. H$_2$:CO ratio | 0.75:1.00-0.85:1.00 |

A typical H$_2$:CO ratio is about 0.8:1. Since the hydrogen to carbon monoxide ratio may not match with the minimum specifications, syngas must therefore be conditioned. In order to increase the hydrogen content in the syngas, some of its carbon monoxide (CO) could be processed through a shift reaction. The lead reaction is shown below and the resulting products are 1 mole of hydrogen and 1 mole of carbon dioxide per mole of carbon monoxide reacting with 1 mole of water vapor.

$$CO + H_2O \rightarrow H_2 + CO_2$$

Figure 12:
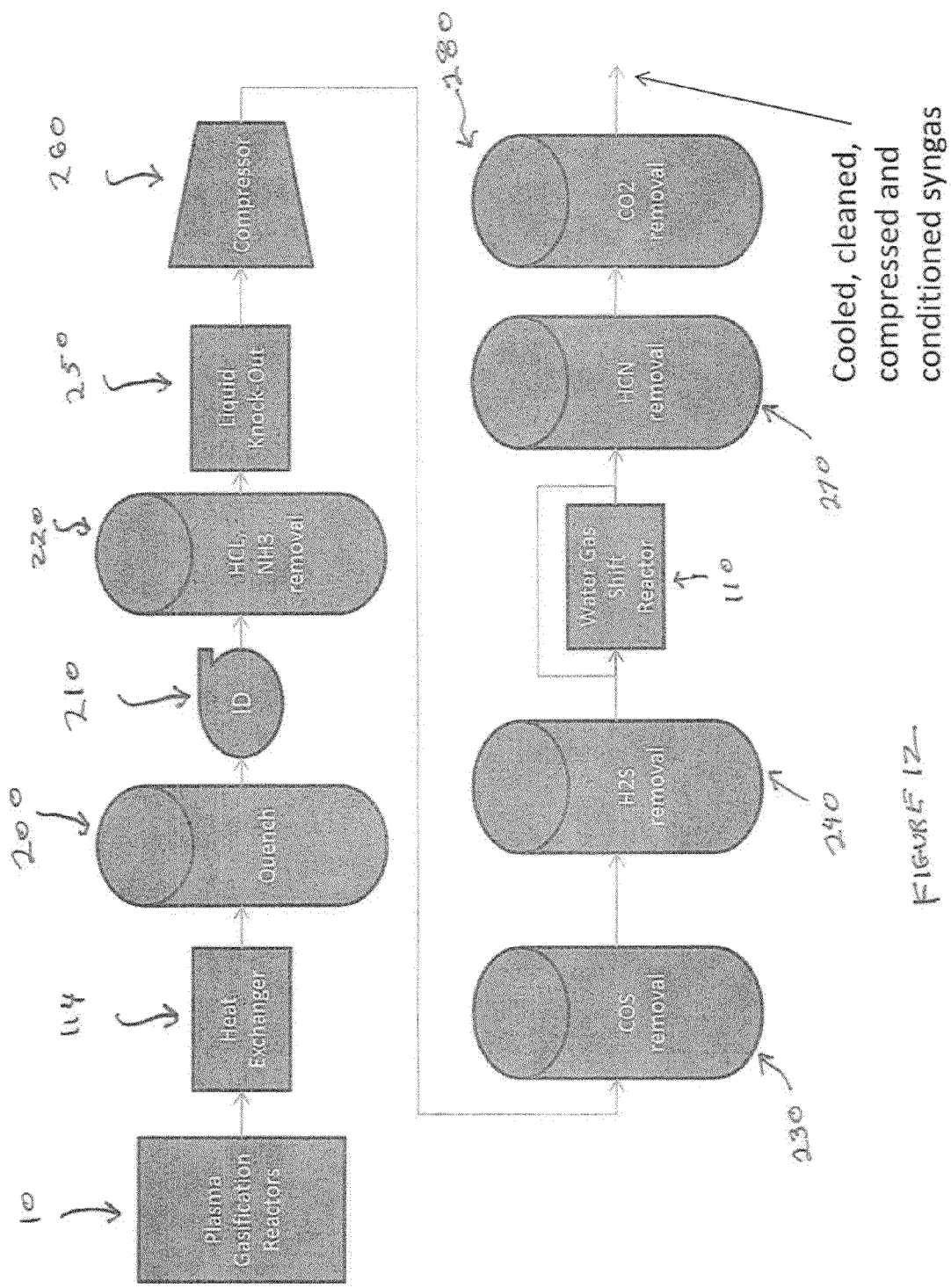
FIG. 12 is a schematic diagram illustrating some of the basic steps employed in an example of syngas cleaning and conditioning operation according to certain embodiment of this disclosure.

The cleaning process is very similar to the one described in the above referenced US Patents and need not be discussed herein in any detail as could be practiced by those skilled in the in the absence of undue experimentation. FIG. 12 is a rendering of the cleaning island. This cleaning island may also contain a $CO_2$ removal system 280. It mainly comprises a cooling system by means of a heat exchanger 114, a cleaning island by means of a quench tower 200 to remove any particulate matter, an induced draft blower 210, a battery of apparatus 220, 230, 240 and 270 to remove impurities such as HCl, HCN, $NH_3$, COS and $H_2S$ along with a liquid knock-out system 250 and a syngas compressor 260. Further in this disclosure, the "syngas cleaning" box in some figures may have been altered and removed from the "syngas cleaning" box to emphasize on a particular system(s). In any case, the complete syngas cooling, cleaning, compression and conditioning process typically comprises the systems shown in FIG. 12.

Figure 3:
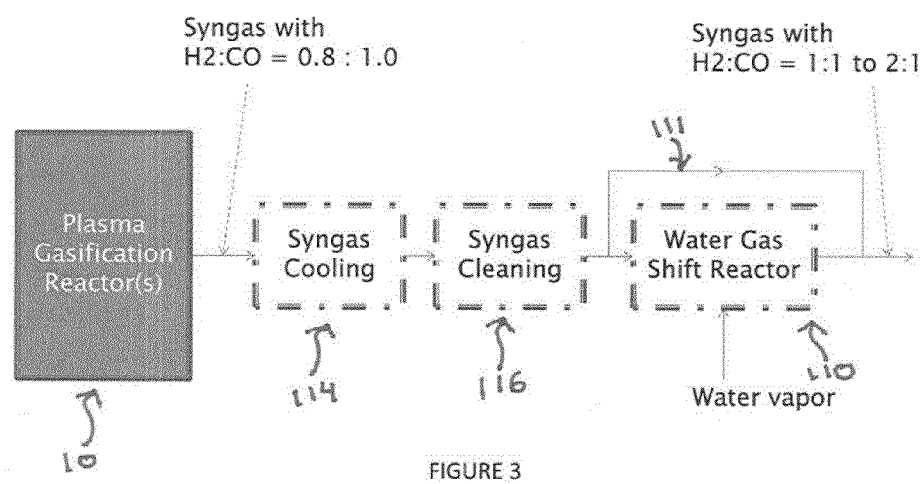
FIG. 3 is a schematic diagram of partial apparatus illustrating some of the basic steps employed according to an embodiment of this disclosure.

A schematic is provided in FIG. 3 to reflect the process for conditioning the syngas. The syngas exiting the gasifier 10 can be sent to a heat exchanger 114 for cooling and then to cleaning apparatus 116 which is disclosed in more detailed in FIG. 12. It should be noted that some of the syngas by-passes the water gas shift reactor (WGSR) 110 via conduit 111 as a means to provide more flexibility to adjust the $H_2$:CO ratio at the outlet of the WGSR. In a typical facility, the gasification island would operate four (4) plasma gasification reactors 10, each reactor operating at a nominal capacity that corresponds to 75% of its maximum capacity. This increases the gasification island's reliability, ensuring the production of 100% of the necessary syngas should one (1) of the plasma gasification reactors must be shut down.

Figure 4:
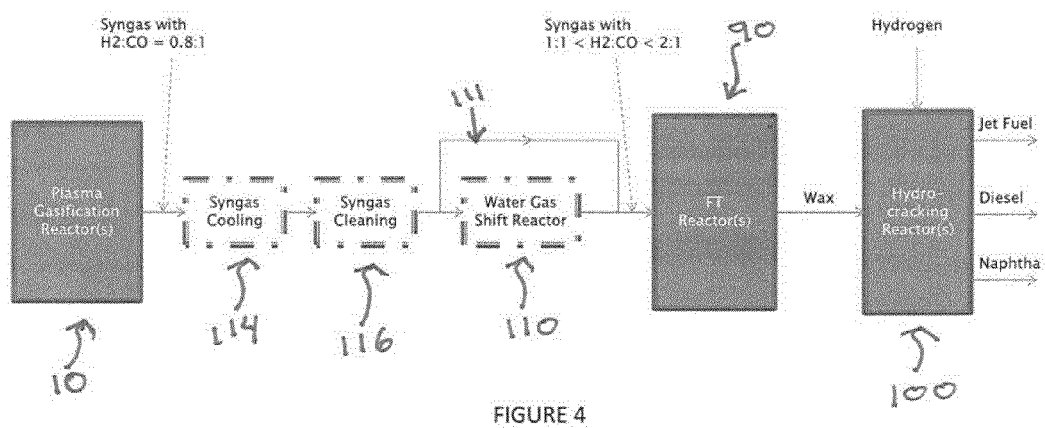
FIG. 4 is a schematic diagram of a steam methane reformer that can be employed according to an embodiment of this disclosure.

A more detailed plant block flow diagram is given in FIG. 4. In an alternative case scenario, where the syngas does not meet the expected composition at the outlet of the gasification reactors despite the control system, then the resulting Fischer-Tropsch operations are altered thus modifying the hydrocarbon liquid production. Therefore, to increase the robustness and the reliability of the facility, and to ensure that 100% of the necessary syngas is delivered to the Fischer-Tropsch system, some natural gas could be reformed into a gas of synthesis by means of a steam methane reformer. This syngas is subsequently blended with the bio-syngas in such quantities that the right amount of CO and $H_2$ is available at the inlet of the Fischer-Tropsch system. In a similar way, should the bio syngas flow rate fluctuate, then some natural gas could be reformed into a gas of synthesis to top-off the right quantity of CO and $H_2$ at the inlet of the Fischer-Tropsch system.

The governing equation in the steam methane reformer (SMR) is given below and a typical $H_2$:CO ratio of 3:1 is achieved.

$$CH_4 + H_2O \rightarrow CO + 3H_2$$

However, depending upon the operating conditions, greater $H_2$:CO ratio could be achieved, typically up to 5:1 and even 6:1.

Figure 5:
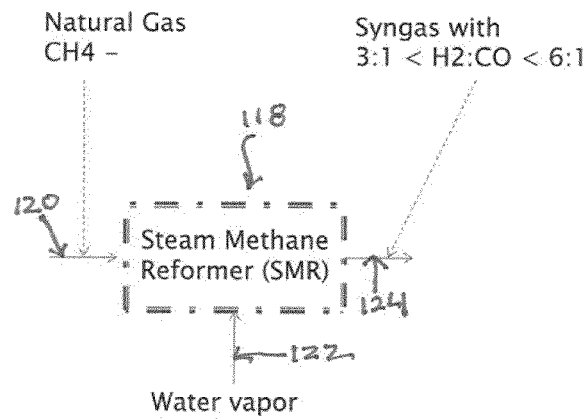
FIG. 5 is a schematic diagram of apparatus illustrating a steam methane reformer used according to an embodiment of this disclosure.

FIG. 5 shows a steam methane reformer 118, whereby natural gas, $CH_4$, is fed via conduit 120 and water vapor is fed via conduit 122. The syngas exits the steam methane reformer 118 via conduit 124. Considering that the high hydrogen to carbon monoxide ratio ($H_2$:CO) in the syngas at the outlet of the steam methane reformer is at least about 3:1 and could be increased to up to about 6:1, this hydrogen rich syngas makes it very suitable to sieve some of its hydrogen that could be used in the wax unicracking reactor. A hydrogen pressure swing absorption (PSA) could be used to this end and/or integrated with a hydrogen membrane to increase the level of hydrogen purity.

Figure 6:
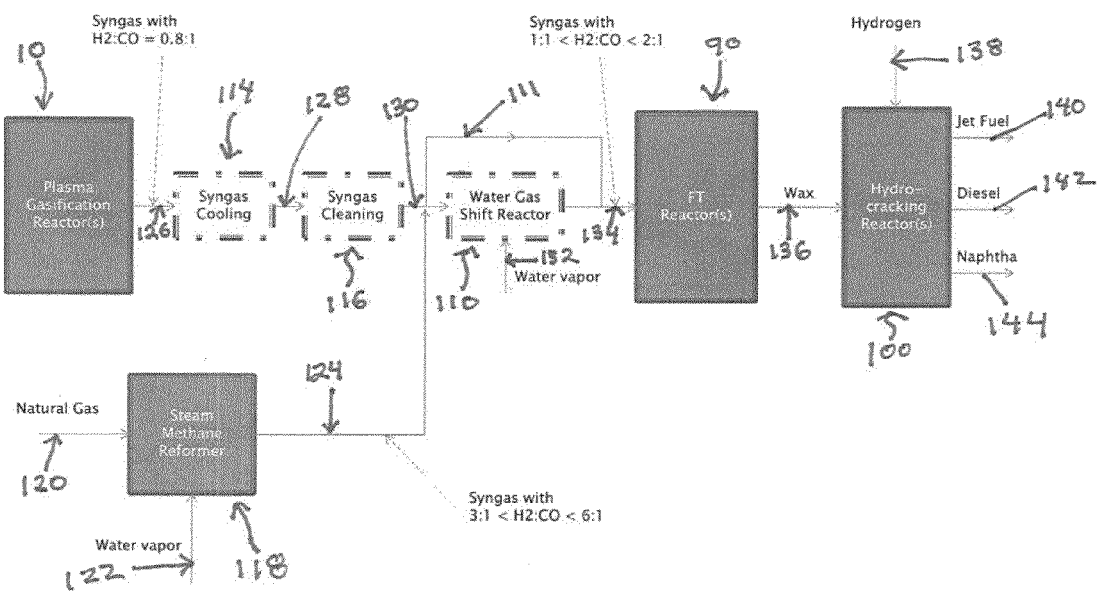
FIG. 6 is a schematic diagram of apparatus illustrating steps employed according to another embodiment of this disclosure.

The more detailed and complete block flow diagrams are shown in FIGS. 6 to 10, with and without the $CO_2$ removal unit to decrease some excess syngas volume. For instance, FIG. 6 illustrates removing syngas from gasifier 10 via conduit 126 and feeding it to heat exchanger 114 for cooling. The cooled syngas exists heat exchanger 114 via conduit 128 and is fed to a battery of scrubbers and other cleaning systems 116. Syngas then leaves the cleaning systems 116 via conduit 130. The cooled syngas is typically at a temperature of about 200-250° C. The goal is to cool the syngas as much as possible; yet to stay above its dew point. The stream leaving the cleaner 116 is split into two streams, one of which is fed into a water gas shift reactor 110. The other stream bypasses the water gas shift reactor 110 and is admixed via conduit 111 with the modified syngas stream exiting the water gas shift reactor 110 via conduit 134. Water vapor is fed to the water gas shift reactor 110 via conduit 132.

Also when needed to adjust the syngas to the desired $H_2$:CO ratio, syngas from steam methane reformer 118 via conduit 124 is admixed with the syngas stream entering the water gas shift reactor 110 via conduit 124.

The syngas mixture now having the desired $H_2$:CO ratio is fed to the Fischer-Tropsch reactor 90 via conduit 134. The wax product from the Fischer-Tropsch reactor is then fed via conduit 136 into hydrocracking reactor 100 along with hydrogen that is fed thereto via conduit 138. Product is removed that includes jet fuel, diesel fuel and naphtha via conduits 140, 142 and 144, respectively.

Figure 7:
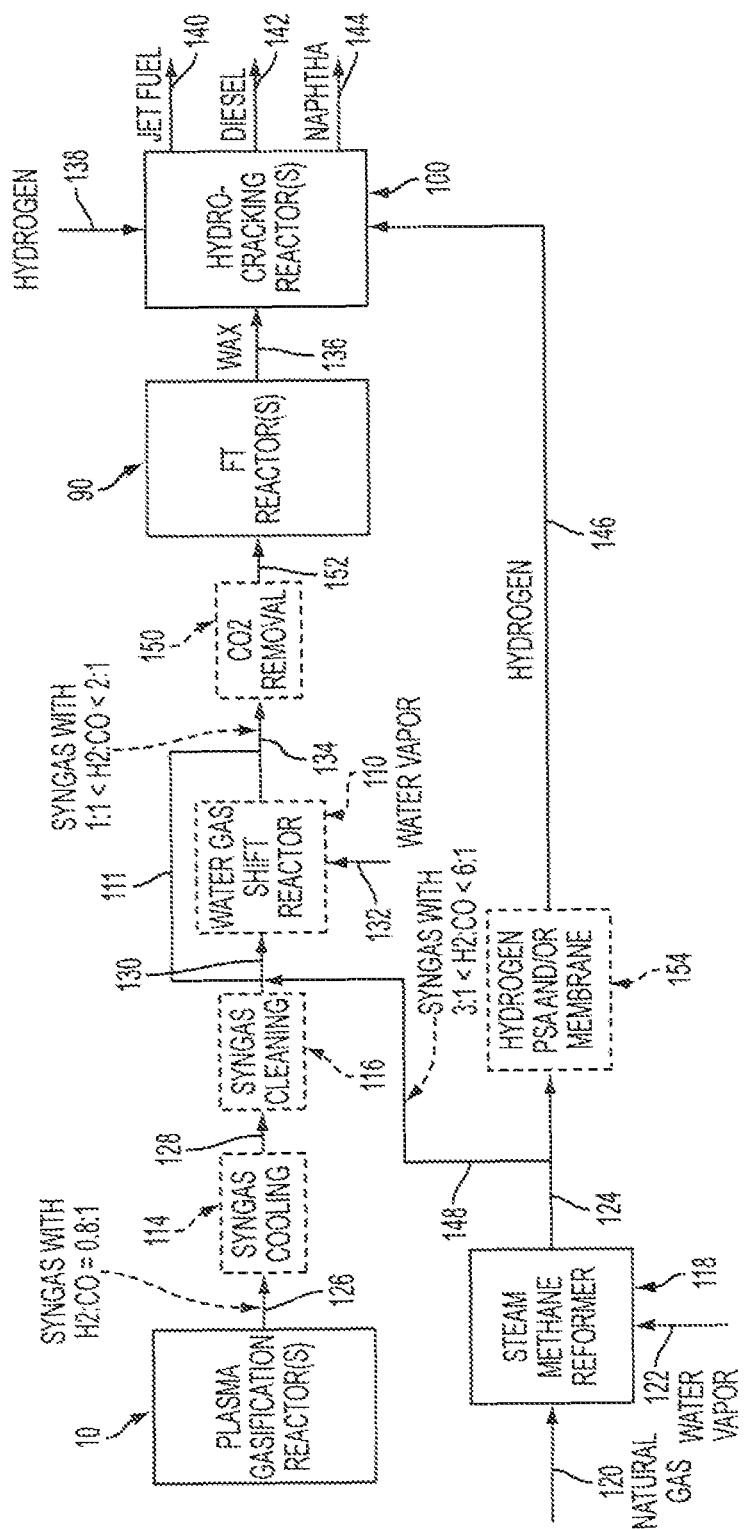
FIG. 7 is a schematic diagram of apparatus illustrating steps employed according to another embodiment of this disclosure.

The process illustrated in FIG. 7 contains processing steps in addition to that shown in FIG. 6. In particular, the hydrogen rich syngas exiting the steam methane reformer 118 via conduit 124 is split into two streams, one of which via conduit 148 becomes admixed with the syngas stream entering the water gas shift reactor 110 as described above for the process illustrated in FIG. 6. The other stream via conduit 124 is fed to a hydrogen pressure swing absorption (PSA) process and/or a hydrogen membrane 154 to increase the level of hydrogen purity. The hydrogen from 154 can be fed via conduit 146 to hydrocracking reactor 100. In addition, syngas exiting the water gas shift reactor 110 via conduit 134 can be fed to $CO_2$ removal apparatus 150 and then to Fischer-Tropsch reactor 90 via conduit 152. Depending upon the amount of hydrogen produced in 154 and delivered to hydrocracker 100 through conduit 146, hydrogen delivered through conduit 138 may become unnecessary anymore in steady state operations, but hydrogen may be delivered through conduit 138 during transient phases from a hydrogen back-up tank to increase redundancy.

Figure 8:
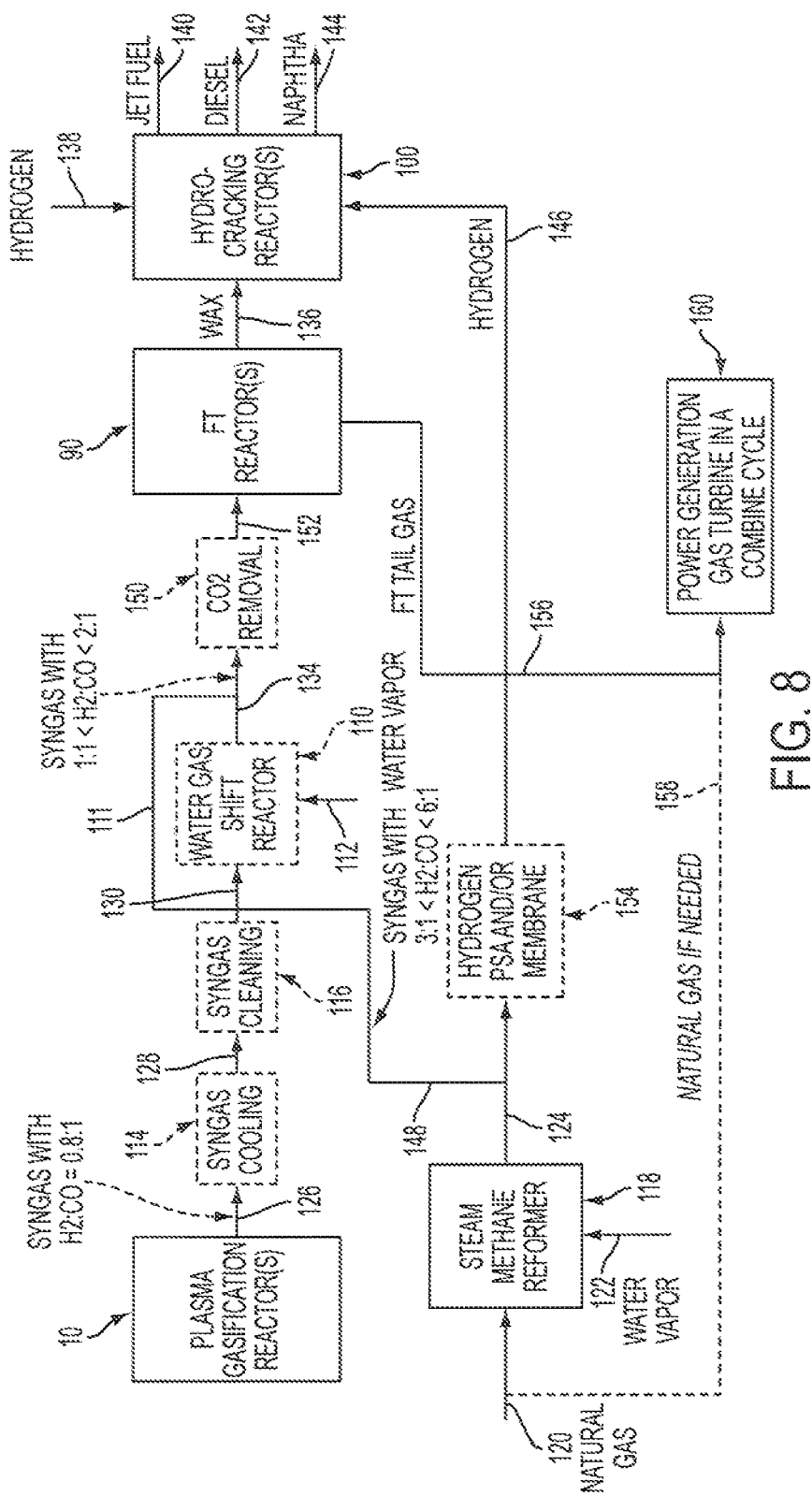
FIG. 8 is a schematic diagram of apparatus illustrating steps employed according to another embodiment of this disclosure.

The process illustrated in FIG. 8 contains processing steps in addition to those shown in FIG. 7. In particular, FIG. 8 illustrates additionally removing Fischer-Tropsch tail gas from Fischer-Tropsch reactor 90 via conduit 156 and feeding it to a power generation system 160 containing, for example, of a combined cycle with a gas turbine or a boiler in a combined cycle Also, natural gas can be fed to 160 via conduit 158, when desired or needed.

Figure 9:
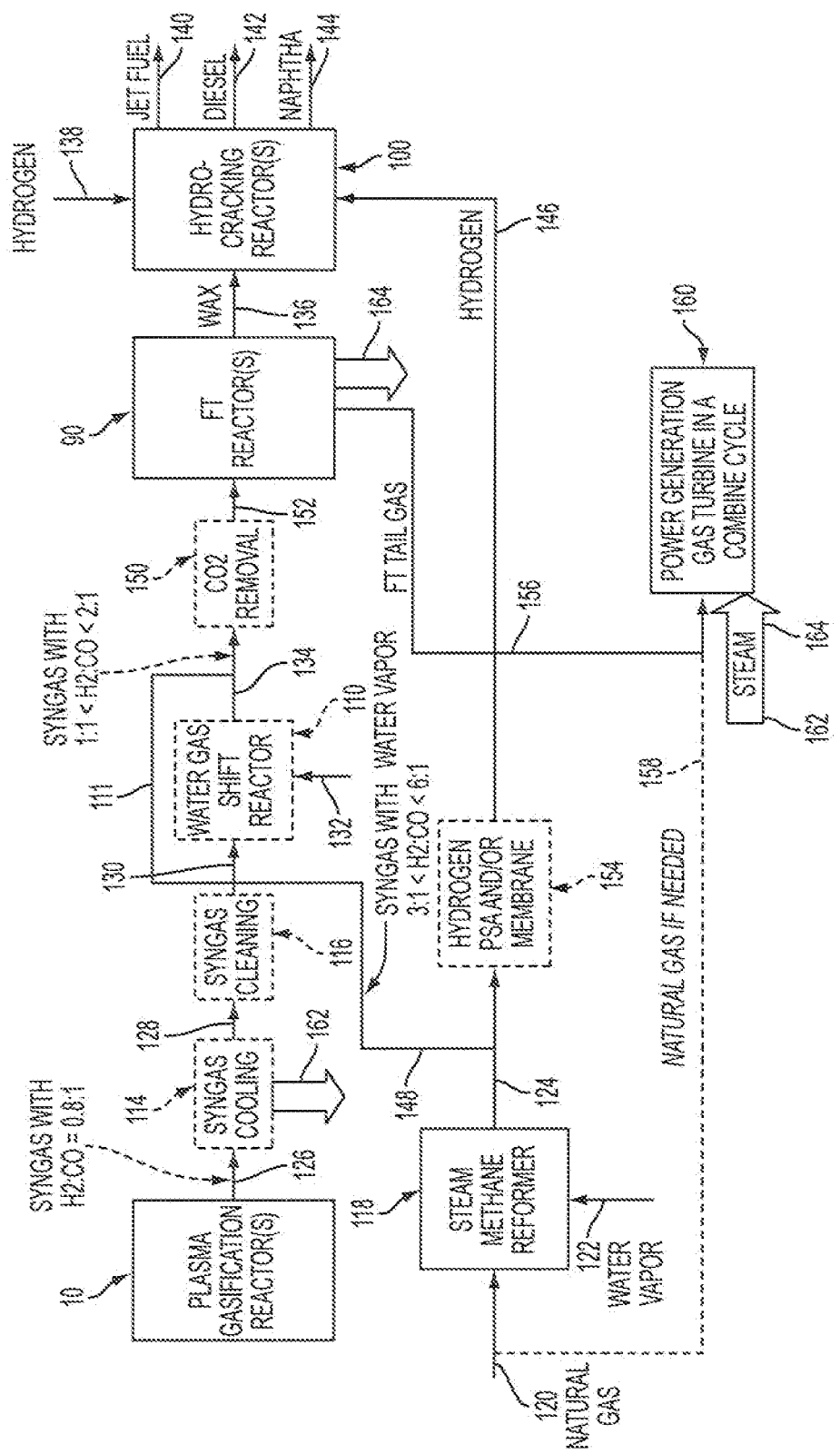
FIG. 9 is a schematic diagram of apparatus illustrating steps employed according to another embodiment of this disclosure.

The process illustrated in FIG. 9 contains processing steps in addition to those shown in FIG. 8. In particular steam byproduct 162 from syngas cooler 114 and/or steam byproduct 164 from Fischer-Tropsch reactor 90 can be fed to gas turbine powered generator 160.

Figure 10:
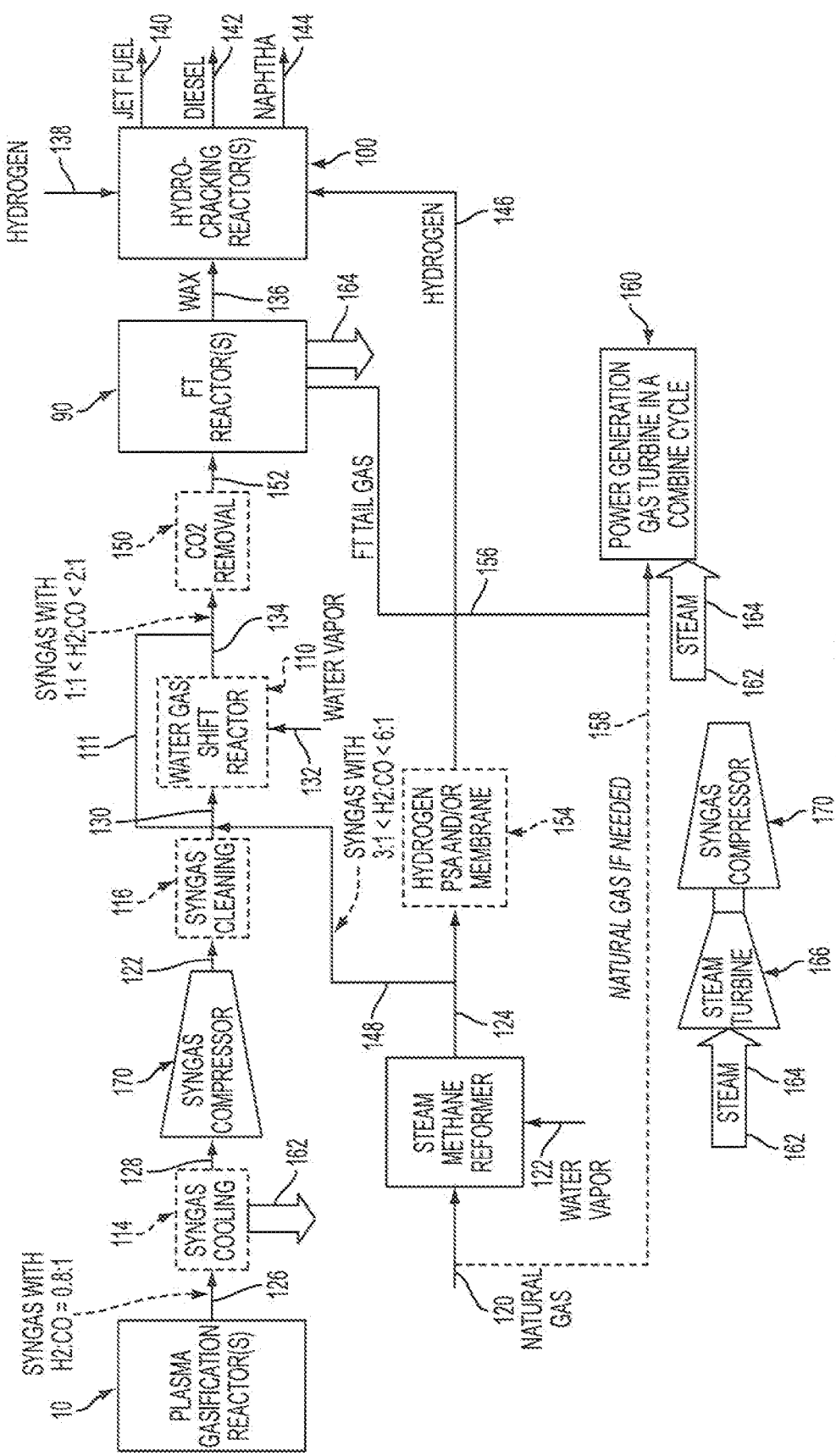
FIG. 10 is a schematic diagram of apparatus illustrating steps employed according to another embodiment of this disclosure.

The process illustrated in FIG. 10 contains processing steps in addition to those shown in FIG. 9 and the syngas compressor has been removed from the cleaning island. In particular, cooled syngas exiting 114 via conduit 128 is fed to a syngas compressor 170. The compressed syngas exits compressor 170 via conduit 172 and is fed to syngas cleaning apparatus 116. Steam byproduct 162 from syngas cooler 114 and/or steam byproduct 164 from Fischer-Tropsch reactor 90 can be processed in a steam turbine 166 that drives the syngas compressor 170. This enables to considerably lower the plant's parasitic loads.

Lastly, considering that all the syngas processed in the Fischer-Tropsch reactor(s) is not synthesized into wax, the corresponding unconverted gaseous fraction—also known as Fischer-Tropsch tail gas—could be used as a gaseous fuel to run a gas turbine in a combined cycle to cover the plant's parasitic loads and therefore ensure that the plant is energy self-sufficient. Some natural gas could be blended with the Fischer-Tropsch tail gas to ensure that the minimum gas turbine criteria are met, such as modified wobbe index, heating content, flow rate, etc.

Additionally, some steam can be recovered throughout the process, particularly at the syngas cooling stage and at the Fischer-Tropsch synthesis since this is a highly exothermic process. This steam could be used for different applications to drive either (i) the combined cycle to produce additional electricity or (ii) a separate steam turbine driving the syngas compressor.

The following case studies and calculations are provided to further facilitate an understanding of the present invention.

1. Cobalt-Based Fischer-Tropsch Catalyst
   a. Base Case—The desired $H_2$:CO molecular ratio at the inlet of the FT system is 2:1 for a Cobalt-based catalyst.

Assuming that the plasma gasification island produces a syngas whose primary component's flow rates are given below:
   Carbon Monoxide [CO]=2112 kmol/hr
   Hydrogen [$H_2$]=1728 kmol/hr
   Once cooled and cleaned, the estimated composition is given below:
   Carbon Monoxide [CO]=2122 kmol/hr
   Hydrogen [$H_2$]=1736 kmol/hr
   At this stage the $H_2$:CO ratio is therefore 0.82.

The amount of hydrogen to provide to the wax unicracking reactor(s) is set at about 150 kg/hr. Assuming the stoichiometric conditions are met, about 400 kg/hr of natural gas or methane would need to be processed into the steam methane reformer to produce 850 kg/hr of syngas and, for the sake of simplicity, natural gas could be modeled as pure methane, i.e. 100% $CH_4$, about 400 kg/hr of Natural gas(NG)+450 kg/hr of water vapor→700 kg/hr of [CO]+150 kg/hr of [$H_2$]

This means that all the reformed syngas produced is sent to the hydrogen PSA and/or membrane to sieve the hydrogen for the wax unicracking's needs and that no reformed syngas will be blended with the syngas derived from the plasma gasification island at the inlet of the Water Gas Shift Reactor. Therefore, the syngas composition at the inlet of the WGSR system has not changed and it is still:
   Carbon Monoxide [CO]=2122 kmol/hr
   Hydrogen [H2]=1736 kmol/hr
   In order to achieve the necessary $H_2$:CO=2:1, about 860 kmol/hr of carbon monoxide needs to be processed into the WGSR, which corresponds to about 24,000 kg/hr of carbon monoxide. In the WGSR, the carbon monoxide thus shall react with about 15,500 kg/hr of water vapor. This means that about 40% of the syngas is processed through the WGSR and the remaining 60% by-passes the WGSR. Consequently, the resulting syngas composition at the outlet of the WGSR is now:
   Carbon Monoxide [CO]=1264 kmol/hr
   Hydrogen [$H_2$]=2595 kmol/hr
   This corresponds to the quantities of [CO] and [H2] that are delivered to the FT reactor(s), which corresponds to $H_2$:CO ratio of about 2:1.

b. Alternate Case
   Assuming that the plasma gasification island produces a syngas whose primary component's flow rate are given below:
   Carbon Monoxide [CO]=1408 kmol/hr
   Hydrogen [$H_2$]=1152 kmol/hr
   Once cooled and cleaned, the estimated composition is given below:
   Carbon Monoxide [CO]=1415 kmol/hr
   Hydrogen [$H_2$]=1157 kmol/hr
   At this stage the $H_2$:CO ratio is therefore 0.82.

Nonetheless, since the initial quantity of [CO] and [$H_2$] to be delivered to the FT reactor(s) is not met, additional syngas must be generated by the Steam Methane Reformer.

The amount of hydrogen to provide to the wax unicracking reactor(s) is still set at about 150 kg/hr since the same quantity of [CO] and [$H_2$] will be delivered to the FT reactor(s). Assuming the stoichiometric conditions are met and, for the sake of simplicity, natural gas could be modeled as pure methane, i.e. 100% $CH_4$, about 5,600 kg/hr of natural gas or methane would need to be processed into the steam methane reformer to produce about 11,900 kg/hr of syngas.

5,600 kg/hr of NG+6,300 kg/hr of water vapor→9,800 kg/hr of [CO]+2,100 kg/hr of [$H_2$]

Off the 11,900 kg/hr of reformed syngas produced, about 7% will be sent to the hydrogen PSA and/or membrane (i.e. 700 kg/hr of [CO] and 150 kg/hr of [$H_2$]) whereas the remaining 93% are blended with the syngas derived from the plasma gasification island at the inlet of the Water Gas Shift Reactor.

Therefore, the syngas composition at the inlet of the WGSR system has indeed changed and it is:
   Carbon Monoxide [CO]=1739 kmol/hr
   Hydrogen [$H_2$]=2130 kmol/hr
   In order to achieve the necessary $H_2$:CO=2:1, about 470 kmol/hr of carbon monoxide needs to be processed into the WGSR, which corresponds to about 13,250 kg/hr of carbon monoxide. In the WGSR, the carbon monoxide thus shall react with about 8,500 kg/hr of water vapor. This means that about 27% of the syngas is processed through the WGSR and the remaining 73% by-passes the WGSR. Consequently, the resulting syngas composition at the outlet of the WGSR is now:
   Carbon Monoxide [CO]=1266 kmol/hr
   Hydrogen [$H_2$]=2603 kmol/hr
   This corresponds to the same quantities of [CO] and [$H_2$] that are delivered to the FT reactor(s), which corresponds to $H_2$:CO ratio of about 2:1.

2. Iron-Based Fischer-Tropsch Catalyst
   a. Base Case—The desired H2:CO molecular ratio at the inlet of the FT system is 1:1 for an Iron-based catalyst.
   Assuming that the plasma gasification island produces a syngas whose primary component's flow rate is given below:
   Carbon Monoxide [CO]=1637 kmol/hr
   Hydrogen [$H_2$]=1339 kmol/hr Once cooled and cleaned, the estimated composition is given below:
Carbon Monoxide [CO]=1645 kmol/hr
Hydrogen [H$_2$]=1345 kmol/hr
At this stage the H$_2$:CO ratio is therefore 0.82.

The amount of hydrogen to provide to the wax unicracking reactor(s) is set at about 115 kg/hr. Assuming the stoichiometric conditions are met, and for the sake of simplicity, natural gas could be modeled as pure methane, i.e. 100% CH$_4$, about 300 kg/hr of natural gas or methane would need to be processed into the steam methane reformer to produce 650 kg/hr of syngas.

$$300 \text{ kg/hr of NG} + 350 \text{ kg/hr of water vapor} \rightarrow 535 \text{ kg/hr of [CO]} + 115 \text{ kg/hr of [H}_2\text{]}$$

This means that all the reformed syngas produced is sent to the hydrogen PSA and/or membrane to sieve the hydrogen for the wax unicracking's needs and that no reformed syngas will be blended with the syngas derived from the plasma gasification island at the inlet of the Water Gas Shift Reactor. Therefore, the syngas composition at the inlet of the WGSR system has not changed and it is still:
Carbon Monoxide [CO]=1645 kmol/hr
Hydrogen [H$_2$]=1345 kmol/hr In order to achieve the necessary H$_2$:CO=1:1, about 150 kmol/hr of carbon monoxide needs to be processed into the WGSR, which corresponds to about 4,200 kg/hr of carbon monoxide. In the WGSR, the carbon monoxide thus shall react with about 2,700 kg/hr of water vapor. This means that about 9% of the syngas is processed through the WGSR and the remaining 91% by-passes the WGSR. Consequently, the resulting syngas composition at the outlet of the WGSR is now:
Carbon Monoxide [CO]=1495 kmol/hr
Hydrogen [H$_2$]=1495 kmol/hr This corresponds to the quantities of [CO] and [H$_2$] that are delivered to the FT reactor(s), which corresponds to H$_2$:CO ratio of about 1:1.

b. Alternate Case

Assuming that the plasma gasification island produces a syngas whose primary is given below:
Carbon Monoxide [CO]=1408 kmol/hr
Hydrogen [H2]=1152 kmol/hr Once cooled and cleaned, the estimated composition is given below:
Carbon Monoxide [CO]=1415 kmol/hr
Hydrogen [H$_2$]=1157 kmol/hr
At this stage the H$_2$:CO ratio is therefore 0.82.

Nonetheless, since the initial quantity of [CO] and [H$_2$] to be delivered to the FT reactor(s) is not met, additional syngas must be generated by the Steam Methane Reformer.

The amount of hydrogen to provide to the wax unicracking reactor(s) is still set at about 115 kg/hr since the same quantity of [CO] and [H$_2$] will be delivered to the FT reactor(s). Assuming that the stoichiometric conditions are met and, for the sake of simplicity, natural gas could be modeled as pure methane, i.e. 100% CH$_4$, about 2,000 kg/hr of natural gas or methane would need to be processed into the steam methane reformer to produce about 4,250 kg/hr of syngas.

$$2{,}000 \text{ kg/hr of NG} + 2{,}250 \text{ kg/hr of water vapor} \rightarrow 3{,}500 \text{ kg/hr of [CO]} + 750 \text{ kg/hr of [H2]}$$

Off the 4,250 kg/hr of reformed syngas produced, about 15% will be sent to the hydrogen PSA and/or membrane (i.e. 530 kg/hr of [CO] and 115 kg/hr of [H$_2$]) whereas the remaining 85% is blended with the syngas derived from the plasma gasification island at the inlet of the Water Gas Shift Reactor.

Therefore, the syngas composition at the inlet of the WGSR system has indeed changed and it is:
Carbon Monoxide [CO]=1521 kmol/hr
Hydrogen [H$_2$]=1474 kmol/hr In order to achieve the necessary H$_2$:CO=1:1, about 23 kmol/hr of carbon monoxide needs to be processed into the WGSR, which corresponds to about 650 kg/hr of carbon monoxide. In the WGSR, the carbon monoxide thus shall react with about 418 kg/hr of water vapor. This means that about 2% of the syngas is processed through the WGSR and the remaining 98% by-passes the WGSR. Consequently, the resulting syngas composition at the outlet of the WGSR is now:
Carbon Monoxide [CO]=1497 kmol/hr
Hydrogen [H$_2$]=1497 kmol/hr This corresponds to the same quantities of [CO] and [H$_2$] that are delivered to the FT reactor(s), which corresponds to H$_2$:CO ratio of about 1:1.

Exemplary embodiments of the present disclosure include:

Embodiment 1

A process for producing liquid fuel from biomass feed stock which comprises:
a) feeding a biomass feedstock into a one stage atmospheric pressure thermocatalytic plasma gasifier, contacting the feedstock with oxygen or oxygen enriched air or steam or mixtures thereof to convert organic components of the biomass into a syngas stream;
b) cooling the syngas through a heat exchanger, cleaning it to remove its particulate matter and chemical impurities and compress it from or about atmospheric pressure to a suitable pressure to meet downstream systems' requirements;
c) splitting the syngas stream into a first stream and a second stream; conveying the first stream to a water gas shift reactor for producing a modified syngas stream containing hydrogen and carbon monoxide at a relative molecular ratio<1:1;
d) the second stream bypassing the water gas shift reactor and being added to the modified syngas steam from the water gas shift reactor;
e) optionally reforming natural gas by steam methane reforming to produce a synthetic gas and optionally adding the synthetic gas to the water gas shift reactor;
f) obtaining syngas having a H$_2$:CO ratio of about 1:1 to about 2:1 from c), d) and optionally e);
g) subjecting the syngas having a H$_2$:CO ratio of about 1:1 to about 2:1 to a Fischer Tropsch reaction thereby producing a wax product; and
h) subjecting the wax product to a hydrogen cracking process to produce the liquid fuel.

Embodiment 2

The process according to Embodiment 1, wherein said impurities comprise at least one member selected from the group consisting of HCl, NH$_3$, COS, HCN, H$_2$S, and CO$_2$.

Embodiment 3

The process according to Embodiments 1 or 2, wherein the syngas stream from a) is cooled syngas to a temperature of above its dew point.

Embodiment 4

The process according to any one of Embodiments 1 to 3, wherein the syngas stream from a) is cooled to a temperature of about 200-250° C.

Embodiment 5

The process according to any one of Embodiments 1 to 4, wherein syngas is conditioned in such a way that it hydrogen to carbon monoxide molecular ratio is controlled and monitored to range between 1 and 2 to match with a Fischer-Tropsch system' requirements.

Embodiment 6

The process according to any one of the Embodiments 1 to 5, wherein product from the Fischer-Tropsch system is primarily a wax product to be processed in a hydrocracking reactor.

Embodiment 7

The process according to embodiment 6, wherein the hydrocracking products from the hydrocracking comprise at least one member selected from the group consisting of jet fuel, diesel fuel and naphtha.

Embodiment 8

The process according to any one of Embodiments 1 to 7, wherein the syngas exiting the steam methane reformer is hydrogen rich and is split into two streams, one of which is admixed with the syngas stream entering the water gas shift reactor and the other stream is fed to a hydrogen pressure swing absorption (PSA) process or a hydrogen membrane or both to increase the level of hydrogen purity.

Embodiment 9

The process according Embodiment 8, which further comprises sending the hydrogen to hydrocracking g).

Embodiment 10

The process according to any one of Embodiments 1-9, which further comprises removing $CO_2$ syngas from the water gas shift reaction prior to Fischer-Tropsch reaction f).

Embodiment 11

The process according to any one of Embodiments 1-10, which further comprises removing Fischer-Tropsch tail gas from Fischer-Tropsch reaction f) and feeding the tail gas to a power generation system.

Embodiment 12

The process according to Embodiment 11, wherein said power generation system comprises a gas turbine or a boiler in a combined cycle.

Embodiment 13

The process according to any one of Embodiments 2-12, wherein steam byproduct from cooling syngas or steam byproduct from Fischer-Tropsch reaction g) or both is fed to a gas turbine powered generator.

Embodiment 14

The process according to any one of Embodiments 2-13, which further comprises feeding cooled syngas to a syngas compressor and then to syngas cleaning

Embodiment 15

The process according to Embodiment 14, wherein steam byproduct from cooling syngas or steam byproduct from Fischer-Tropsch reaction g) or both is fed to a steam turbine for driving the syngas compressor.

Embodiment 16

The process according to any one of Embodiments 1-15, which further comprises recovering Fischer-Tropsch tail gas from the Fischer-Tropsch reaction and feeding it to a gas turbine.

Embodiment 17

The process according to any one of Embodiments 1-15, wherein step a) further comprises: providing a catalyst bed in a lower section of the gasifier; providing one or more successive quantities of said material from a plurality of directions into an upper part of a lower section of the gasifier, said upper section having at least one gas exhaust port connected to a fan, said material forming a bed atop said catalyst bed; heating said carbon catalyst bed and said material bed using a plurality of plasma arc torches mounted in said lower section; and introducing into said lower section said oxygen or oxygen enriched air or steam or mixtures thereof.

Embodiment 18

The process according to any one of Embodiments 1-16, wherein said oxygen-enriched air comprises at least about 80% (v/v) of oxygen.

Embodiment 19

The process according to any one of Embodiments 1-18, wherein said oxygen-enriched air comprises at least about 95% (v/v) of oxygen.

Embodiment 20

The process according to any one of Embodiments 1-19, wherein said organic material has a particle diameter size of about 2 cm to about 5 cm.

Embodiment 21

The process according to claim 1-20, wherein said organic material has a particle diameter size of about 3 cm to about 5 cm.

Embodiment 22

The process according to Embodiment 17, wherein the temperature in the carbon catalyst bed in the lower section is greater 3000° C.

Embodiment 23

An apparatus for converting biomass feedstock into liquid fuel which comprises:

a) a gasifier comprising an inlet for introducing a biomass feedstock and outlet conduit for removing a syngas;

b) the outlet conduit from the gasifier leads to an inlet of a syngas cooling system to raise steam that can either be exported or used by the facility as a utility;

c) the outlet of the cooling system leads to a cleaning system that comprises a quenching system to remove particulate matter contained in the syngas and subsequent scrubbers to remove chemical impurities;

d) the outlet of the cleaning system leads to a compressor to raise the syngas pressure to such a level that it meets downstream equipment's requirements;

e) the outlet of the compressor leads to a splitting system, wherein the syngas splitting system has two outlets and wherein one of the outlets of the syngas splitting system leads to an inlet of a water gas shift reactor and the other outlet bypasses the water gas shift reactor and leads to an outlet from the water gas shift reactor to combine with the product from the water gas shift reactor;

f) an inlet for natural gas into a steam methane reformer and outlet from the steam methane reformer for exiting a synthetic gas from the steam methane reformer and for leading the synthetic gas to an inlet to the water gas shift reactor to combine with syngas in the water gas shift reactor;

g) the outlet from the water gas shift reactor leading to an inlet to a Fischer Tropsch reactor;

h) an outlet from the Fischer Tropsch reactor for exiting a wax product;

i) the outlet from the Fischer Tropsch reactor leading to an inlet to a hydrogen cracking reactor; and j) an outlet from the hydrogen cracking reactor for removing liquid fuel from the hydrogen cracking reactor.

Embodiment 24

The apparatus according to Embodiment 23, which further comprises an outlet conduit from the steam methane reformer that leads to an inlet of a syngas splitting system for splitting syngas exiting the steam methane reformer into two streams so that one of which can be fed to the water gas shift reaction and the other stream can be fed to a hydrogen pressure swing absorption (PSA) process or a hydrogen membrane or both to increase the level of hydrogen purity.

Embodiment 25

The apparatus according to Embodiment 24, which further comprises an outlet from said hydrogen pressure swing absorption (PSA) process or a hydrogen membrane or both leading to an inlet of the hydrocracker.

Embodiment 26

The apparatus according to any one of Embodiments 23-25, which further comprises a system for removing $CO_2$ syngas from the water gas shift reactor prior to the Fischer-Tropsch reactor.

Embodiment 27

The apparatus according to any one of Embodiments 23-26, which further comprises an outlet from the Fischer-Tropsch reactor for removing Fischer-Tropsch tail gas and conduit for feeding the tail gas to a power generation system.

Embodiment 28

The apparatus according to Embodiment 27, wherein said power generation system comprises a gas turbine or a boiler in a combined cycle.

Embodiment 29

The apparatus according to Embodiment 23, which further comprises an outlet from said cooler for recovering steam byproduct therefrom or an outlet from the Fischer-Tropsch reactor for recovering steam byproduct therefrom or both and conduit for feeding said steam byproduct to a gas turbine powered generator.

Embodiment 30

The apparatus according to Embodiment 23, which further comprises a syngas compressor which has an outlet feeding to the syngas cleaner.

Embodiment 31

The apparatus according to Embodiment 30, which further comprises an outlet from said cooler for recovering steam byproduct therefrom or an outlet from the Fischer-Tropsch reactor for recovering steam byproduct therefrom or both and conduit for feeding to a steam turbine for driving the syngas compressor.

Embodiment 32

The apparatus according to any one of Embodiments 23-31, which further comprises an outlet from the Fischer-Tropsch reactor for removing Fischer-Tropsch tail gas and conduit for feeding the tail gas to a gas turbine.

Embodiment 33

The apparatus according to any one of Embodiments 23-32, wherein the gasifier comprises: a generally funnel-shaped reactor having an upper section and a lower section, said lower section comprising a first, wider portion connected by a frustoconical transition to a second, narrower portion, and being suitable to receive a catalyst bed, and said upper section having at least one gas exhaust port; a plurality of inlets for said material from a plurality of directions located at the upper part of said lower section for introducing said material into said upper portion of said lower section; a gas inlet system disposed around said lower section to provide gas into said lower section through one or more intake ports in said lower section; and a plurality of plasma arc torches mounted in said lower section to heat said catalyst bed and said material.

Embodiment 34

The apparatus according to Embodiment 33, wherein the gasifier further comprises: a material delivery system to provide said material to said reactor through said plurality of intake ports, said delivery system comprising: a receptacle to receive said material, a shredding and compacting unit disposed to accept said material from said receptacle and to shred and compact said material, and a transfer unit to deliver said shredded and compacted material to said reactor.

Embodiment 35

The apparatus according to Embodiment 34 wherein said material comprises biomass material selected from the group consisting of agriculture waste, refused derived fuel, municipal solid waste and other biomass resource as defined by the UNFCC (EB 20, Report, Annex 8, page 1).

Embodiment 36

An apparatus according to Embodiment 35 wherein said catalyst bed height ranges between 50 cm to about 1 meter in height.

Embodiment 37

The apparatus according to Embodiment 34 further comprising a plurality of sensors disposed throughout said reactor to sense one or more of: a height of said carbon catalyst bed, a height of a bed of said material, a temperature of said reactor, a flow rate of gas in said reactor, and a temperature of a gas exhausted from said reactor through said exhaust port.

Embodiment 38

The apparatus according to Embodiment 33 wherein said lower section has one or more tap holes at a bottom thereof.

The term "comprising" (and its grammatical variations) as used herein is used in the inclusive sense of "having" or "including" and not in the exclusive sense of "consisting only of." The terms "a" and "the" as used herein are understood to encompass the plural as well as the singular. The term "atmospheric pressure" as used herein refers to atmospheric pressure (about 101325 Pa) and pressure below atmospheric pressure, wherein slightly below is typically up to about 500 Pa below atmospheric pressure and more typically about 200 Pa to about 500 Pa below atmospheric pressure.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments. Each of the claims defines a separate invention, which for infringement purposes is recognized as including equivalents to the various elements or limitations specified in the claims.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

What is claimed is:

1. A process for producing liquid fuel from biomass feed stock which comprises:
    a) feeding a biomass feedstock into a one stage atmospheric pressure thermo-catalytic plasma gasifier, contacting the feedstock with oxygen or oxygen enriched air or steam or mixtures thereof to convert organic components of the biomass into a syngas stream;
    b) cooling the syngas through a heat exchanger, cleaning it to remove its particulate matter and chemical impurities and compressing it from atmospheric pressure or about atmospheric pressure to a suitable pressure to meet downstream requirements of the process;
    c) splitting the syngas stream into a first stream and a second stream; conveying the first stream to a water gas shift reactor for producing a modified syngas stream containing CO and hydrogen;
    d) the second stream bypassing the water gas shift reactor and being added to the modified syngas steam from the water gas shift reactor;
    e) optionally reforming natural gas by steam methane reforming to produce additional synthetic gas and optionally adding the additional synthetic gas to the water gas shift reactor;
    f) obtaining syngas having a $H_2$:CO ratio of about 1:1 to about 2:1 from c), d) and optionally e);
    g) subjecting the syngas having a $H_2$:CO ratio of about 1:1 to about 2:1 to a Fischer Tropsch reaction thereby producing a wax product; and
    h) subjecting the wax product to a hydrogen cracking process to produce the liquid fuel.

2. The process according to claim 1, wherein the syngas stream from a) is cooled syngas to a temperature of above its dew point.

3. The process according to claim 1, wherein the syngas stream from a) is cooled to a temperature of about 200-250° C.

4. The process according to any one of claim 1, 2 or 3, wherein product from the hydrogen cracking process comprises at least one member selected from the group consisting of jet fuel, diesel fuel and naphtha.

5. The process according to any one of claim 1, 2 or 3 wherein exiting from the steam methane reformer is syngas that is hydrogen rich and is split into two streams, one of which is admixed with the syngas stream entering the water gas shift reactor and the other stream is fed to a hydrogen pressure swing absorption (PSA) process or a hydrogen membrane or both to increase the level of hydrogen purity.

6. The process according to claim 5, which further comprises sending the hydrogen to hydrogen cracking process h).

7. The process according to any one of claim 1, 2 or 3 which further comprises removing $CO_2$ syngas from the water gas shift reaction prior to Fischer-Tropsch reaction g).

8. The process according to any one of claim 1, 2 or 3 which further comprises removing Fischer-Tropsch tail gas from Fischer-Tropsch reaction g) and feeding the tail gas to a power generation system.

9. The process according to claim 8, wherein said power generation system comprises a gas turbine or a boiler in a combined cycle.

10. The process according to any one of claim 1, 2 or 3 wherein steam byproduct from cooling syngas or steam byproduct from Fischer-Tropsch reaction g) or both is fed to a gas turbine powered generator.

11. The process according to any one of claim 1, 2 or 3, which further comprises feeding cooled syngas to a syngas compressor and then to syngas cleaning.

12. The process according to claim 11, wherein steam byproduct from cooling syngas or steam byproduct from Fischer-Tropsch reaction g) or both is fed to a steam turbine for driving the syngas compressor.

13. The process according to any one of claim 1, 2 or 3, which further comprises recovering Fischer-Tropsch tail gas from the Fischer-Tropsch reaction and feeding it to a gas turbine.

14. The process according to any one of claim 1, 2 or 3, wherein step a) further comprises: providing a catalyst bed in a lower section of the gasifier; providing one or more successive quantities of said biomass feedstock from a plurality of directions into an upper part of a lower section of the gasifier, said upper part having at least one gas exhaust port connected to a fan, said biomass feedstock forming a bed atop said catalyst bed; heating said catalyst bed and said biomass feedstock bed using a plurality of plasma arc torches mounted in said lower section; and introducing into said lower section said oxygen or oxygen enriched air or steam or mixtures thereof.

15. The process according to any one of claim 1, 2 or 3, wherein said oxygen-enriched air comprises at least about 80% (v/v) of oxygen.

16. The process according to any one of claim 1, 2 or 3, wherein said oxygen-enriched air comprises at least about 95% (v/v) of oxygen.

17. The process according to any one of claim 1, 2 or 3, wherein said biomass feedstock has a particle diameter size of about 2 cm to about 5 cm.

18. The process according to any one of claim 1, 2 or 3, wherein said biomass feedstock has a particle diameter size of about 3 cm to about 5 cm.

19. The process according to claim 18, wherein the temperature in the catalyst bed in the lower section is greater 3000° C.

* * * * *